(12) United States Patent
Lee et al.

(10) Patent No.: US 11,275,163 B2
(45) Date of Patent: Mar. 15, 2022

(54) SLAM METHOD AND APPARATUS ROBUST TO WIRELESS ENVIRONMENT CHANGE

(71) Applicant: Korea Institute of Science and Technology, Seoul (KR)

(72) Inventors: Taikjin Lee, Seoul (KR); Youngmin Jhon, Seoul (KR); Jaehun Kim, Seoul (KR); Minah Seo, Seoul (KR); Beomju Shin, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 329 days.

(21) Appl. No.: 16/477,311

(22) PCT Filed: Dec. 28, 2017

(86) PCT No.: PCT/KR2017/015651
§ 371 (c)(1),
(2) Date: Jul. 11, 2019

(87) PCT Pub. No.: WO2018/139773
PCT Pub. Date: Aug. 2, 2018

(65) Prior Publication Data
US 2020/0033463 A1   Jan. 30, 2020

(30) Foreign Application Priority Data

Jan. 25, 2017 (KR) .................. 10-2017-0011988
Sep. 26, 2017 (KR) .................. 10-2017-0124468
Nov. 21, 2017 (KR) .................. 10-2017-0155888

(51) Int. Cl.
*G01S 11/06* (2006.01)
*G01S 5/02* (2010.01)

(52) U.S. Cl.
CPC ............. *G01S 11/06* (2013.01); *G01S 5/0252* (2013.01)

(58) Field of Classification Search
CPC .......... G01S 11/06; G01S 5/0252; G01S 5/02; G01S 5/021; G01S 5/14; H04W 64/00
(Continued)

(56) References Cited

U.S. PATENT DOCUMENTS 7,948,430 B2 * 5/2011 Konishi ................. G01S 13/003
                                                                342/27
2013/0332065 A1 * 12/2013 Hakim .................. G01C 21/206
                                                                701/411
(Continued)

FOREIGN PATENT DOCUMENTS

JP         4868169 B2      2/2012

OTHER PUBLICATIONS

International Search Report dated Apr. 17, 2018 in counterpart International Patent Application No. PCT/KR2017/015651 (2 pages in English and 2 pages in Korean).
(Continued)

*Primary Examiner* — Harry K Liu
(74) *Attorney, Agent, or Firm* — NSIP Law

(57) ABSTRACT

The present invention relates to SLAM (simultaneous localization and mapping) method and apparatus robust to a wireless environment change. A relative position of a moving node is estimated based on motion sensing of the moving node, the relative position of the moving node is corrected based on a comparison between a change pattern of at least one signal strength received over a plurality of time points and a signal strength distribution in a region in which the moving node is located, a route of the region is represented by using the relative position corrected as described above, and thereby, it is possible accurately estimate a position of the moving node and to create a map in which very accurate route information is recorded throughout the entire region at the same time, even if a wireless environment change such
(Continued)

as signal interference between communication channels, expansion of an access point, and occurrence of a failure or an obstacle is made or a poor wireless environment such as lack of the number of access points occurs.

17 Claims, 16 Drawing Sheets

(58) Field of Classification Search
USPC .......................................................... 342/451
See application file for complete search history.

(56) References Cited

U.S. PATENT DOCUMENTS

| 2015/0133148 A1* | 5/2015 | Yang ....................... G06F 16/21 |
| | | 455/456.1 |
| 2016/0216359 A1 | 7/2016 | Huang et al. |

OTHER PUBLICATIONS

Written Opinion of the International Searching Authority dated Apr. 17, 2018 in counterpart International Patent Application No. PCT/KR2017/015651 (7 pages in Korean).

Korean Office Action dated May 21, 2019 in counterpart Korean Patent Application No. 10-2018-0000872 (5 pages in Korean).

\* cited by examiner

FIG. 7

|      | RL1        | RL2        | RL3        | ...  | RLn        |
|------|------------|------------|------------|------|------------|
| AP1  | $RSS_{11}$ | $RSS_{12}$ | $RSS_{13}$ | ...  | $RSS_{1n}$ |
| AP2  | $RSS_{21}$ | $RSS_{22}$ | $RSS_{23}$ | ...  | $RSS_{2n}$ |
| AP3  | $RSS_{31}$ | $RSS_{32}$ | $RSS_{33}$ | ...  | $RSS_{3n}$ |
| ...  | ...        | ...        | ...        | ...  | ...        |
| APm  | $RSS_{m1}$ | $RSS_{m2}$ | $RSS_{m3}$ | ...  | $RSS_{mn}$ |

(a)

|      | AL1 | AL2 | AL3 | ...  | ALn |
|------|-----|-----|-----|------|-----|
| AP1  | -41 | -48 | -51 | ...  | -63 |
| AP2  | -49 | -46 | -44 | ...  | -66 |
| AP3  | -45 | -47 | -50 | ...  | -64 |
| ...  | ... | ... | ... | ...  | ... |
| APm  | -47 | -50 | -53 | ...  | -65 |

(b)

(a)

(b)

(c)

(d)

SLAM METHOD AND APPARATUS ROBUST TO WIRELESS ENVIRONMENT CHANGE

CROSS REFERENCE TO RELATED APPLICATIONS

This application is a U.S. National Stage Application of International Application No. PCT/KR2017/015651, filed on Dec. 28, 2017, which claims the benefit under 35 USC 119(a) and 365(b) of Korean Patent Application No. 10-2017-0011988, filed on Jan. 25, 2017, Korean Patent Application No. 10-2017-0124468, filed on Sep. 26, 2017, and Korean Patent Application No. 10-2017-0155888, filed on Nov. 21, 2017 in the Korean Intellectual Property Office, the entire disclosure of which is incorporated herein by reference for all purposes.

TECHNICAL FIELD

The present invention relates to SLAM method and apparatus which can estimate a position of a moving node in an unknown environment and simultaneously create a map for the unknown environment.

BACKGROUND ART

Recently, interest in a simultaneous localization and mapping (SLAM) technology is increasing in a field of moving robot such as a drone. SLAM is a technology for creating a map for the unknown environment while a robot walks around and recognizes a position thereof using only a sensor attached to the robot without external help, and emerges as a key technology for an autonomous navigation. SLAM of related art estimates a position of a moving robot on the basis of several physical landmarks. In order to identify the landmarks, a sensor such as a LiDAR, a camera, or an ultrasonic sensor is required.

The LiDAR has a very high resolution but is expensive and hard to be applied to a small and light device such as a smartphone due to a limitation in miniaturization. In the same manner, the camera is hard to be applied to the smartphone having a low image data processing capability because the camera outputs image data. The ultrasonic sensor can be miniaturized, but has a very low resolution, and thereby, there is a limitation to create a map with high accuracy. Due to this, the SLAM is attracting attention for a special purpose such as a moving robot put in a disaster region but is not attracting attention for creating a map for localization of a navigation system of a smartphone or a vehicle except for the moving robot.

A global positioning system (GPS)-based map and a wireless localization map are representative examples of a map that is commercialized or researched for localization of a navigation system of a smartphone or a vehicle. The map of related art has a problem that takes a lot of time and cost to create a map because a person creates the map by collecting terrain information or signal information while moving around a region in which a localization service is provided. Particularly, the GPS cannot perform the localization in an indoor space where a radio wave emitted from a satellite cannot reach, and there is a problem that accuracy of the localization in a city is seriously decreased due to blocking, reflection or the like of the radio wave by a high-rise building.

Recently, automobile manufacturers around the world, and global corporations such as Google and Intel have fostered research and development of an autonomous vehicle. However, partial autonomous driving in an outdoor space makes some results, but autonomous driving in the indoor space and the outdoor space is still impossible due to inability of an indoor localization of the GPS. In order to solve the problem of the GPS, a wireless localization technique for estimating a position of a user or a vehicle using a radio signal existing in an indoor space draws much attention. The wireless localization technology is currently being commercialized and serviced, but localization accuracy is very low compared with the GPS, and thus, various types of wireless localization technology are under development.

Wireless communication can be classified into short-range wireless communication and wide-area wireless communication. A representative example of the short-range wireless communication includes Wi-Fi, Bluetooth, Zigbee, and the like, and a representative example of the wide-area wireless communication includes 3rd generation (3G), 4th generation (4G), Lora, and the like. The long term evolution (LTE) is a kind of 4G wireless communication. The short-range wireless communication such as Bluetooth and Zig-Bee is not suitable for a localization because of characteristics that temporarily occur in an indoor space according to needs of a user and disappear. Currently, a Wi-Fi signal and an LTE signal are known to be distributed in most indoor spaces.

Accordingly, a WiFi position system (WPS) that performs a localization using a Wi-Fi signal of a band of 2.4 GHz is in the spotlight. A representative localization technique which uses the WiFi signal may include a fingerprint technique.

This technique divides the indoor space into a grid structure, collects values of signal strength in each unit area, and builds a radio map by storing the values in a database. In a state where the radio map is built as described above, a position of a user is estimated by comparing strength of the signal received at the position of the user with data of the radio map. Since the technique collects data in which spatial characteristics of the indoor space is reflected, the technique has an advantage that localization accuracy is higher than the triangulation technique. As wireless environment is good and many signals are collected by finely dividing the indoor space, the localization precision may be increased up to 2 to 3 meters.

The fingerprint technique performs relatively accurate localization in a case where there is little difference between strength of a signal collected at the time of building a radio map and strength of a signal collected at the time of localization. However, a change in the wireless environment, such as a signal interference between communication channels frequently occurring in the real world, expansion of an access point, occurrence of failure or an obstacle, and the like leads to collection of signal strength different from data of a radio map built in the past, which results in a serious impact on localization accuracy. Accordingly, various attempts have been made to increase the localization accuracy by applying a k-nearest neighbor (KNN), a particle filter or the like to the fingerprint technique.

First of all, due to the fact that a Wi-Fi signal is distributed actually only in a part of the center of a city due to characteristic of short-range wireless communication, the fingerprint technique has an inherent limitation that cannot be used alone for a vehicle navigation system requiring a localization service in both an indoor space and an outdoor space, or autonomous driving. The LTE signal is uniformly distributed in the indoor space and the outdoor space, but there is a limitation to increase a localization accuracy because an area where a change in the signal strength is not large is wide. In this way, a GPS-based map cannot support an indoor space, and a map for wireless localization has a problem in which not only there is a limitation in increasing localization accuracy thereof, but also lots of time and cost are consumed to create the map because a person directly collects terrain information or signal information of a region in which a localization service is provided.

DISCLOSURE

Technical Problem

There is provided SLAM method and apparatus robust to wireless environment change which can accurately estimate a position of a moving node and can create a map with very accurate route information throughout the entire region at the same time, even if the wireless environment change such as signal interference between communication channels, expansion of an access point, and occurrence of a failure or an obstacle is made or a poor wireless environment such as lack of the number of access points occurs and can accurately estimate the position of the moving node without a separate sensor for identifying a physical landmark and create a map with very accurate route information throughout the entire region at the same time. In addition, there is provided a computer-readable recording medium in which a program for causing a computer to execute the above-described SLAM method is recorded. The present invention is not limited to the above-described technical problems as described above, and another technical problem may be derived from the following description.

Technical Solution

A SLAM (simultaneous localization and mapping) method of a moving node according to one aspect of the present invention includes estimating a relative position of the moving node, based on motion sensing of the moving node; generating a change pattern of at least one signal strength that is received over a plurality of time points; correcting the estimated relative position, based on a comparison between the generated change pattern of the signal strength and a signal strength distribution in a region in which the moving node is located; and creating a map for the region by representing a route of the region using the corrected relative position.

The change pattern of the at least one signal strength may be a change pattern of at least one signal strength that is represented as continuous arrangement of at least one signal strength which is received a plurality of times at a plurality of relative positions of the moving node that are estimated at the plurality of time points. The SLAM method may further includes estimating a reception position of a moving node for at least one signal that is received at a current time point among the plurality of time points based on a comparison between the generated change pattern of the signal strength and the signal strength distribution, and the correcting of the relative position may correct the estimated relative position by correcting a coordinate value of the estimated relative position using a coordinate value of the estimated reception position.

The SLAM method may further include searching a part having a pattern most similar to the change pattern of the generated signal strength within the signal strength distribution by comparing the generated change pattern of the signal strength with the signal strength distribution, and the estimating of the reception position may estimate an absolute position in the region that is indicated by the searched part as a reception position of the moving node.

The SLAM method may further include searching, within the signal strength distribution, a surface part having a shape most similar to a pattern of a geometric surface shape that graphically representing a change of at least one signal strength according to a relative change of a position of the moving node, and the estimating of the reception position may estimate an absolute position in the region that is indicated by the searched surface part as a reception position of the moving node.

The generating of the change pattern of the at least one signal strength may generate the pattern of the geometric surface shape in such a manner that a dot is marked on a point of multidimensional space that is determined by mapping an ID of a certain fixed node on a first coordinate axis of the multidimensional space, mapping the relative position of the moving node on a second coordinate axis, and mapping strength of a signal that is transmitted from the certain fixed node on a third coordinate axis.

The correcting of the relative position may correct the coordinate value of the estimated relative position in such a manner that a difference between the coordinate value of the estimated reception position and a coordinate value of a localization point closest to the coordinate value of the reception position among localization points within the signal strength distribution is minimized, and the localization points may be points where the relative position of the moving node is measured on a movement route of the moving node.

The correcting of the relative position may minimize an error between the coordinate value of the estimated relative position and a coordinate value of another relative position of the moving node based on the estimated relative position, and may simultaneously correct the coordinate value of the estimated relative position in such a manner that the difference between the coordinate value of the estimated reception position and the coordinate value of the localization point closest to the coordinate value of the reception position among the localization points within the signal strength distribution is minimized.

The correcting of the relative position may correct the coordinate value of the estimated relative position in such a manner that a difference between a coordinate value of an arrival point which is the estimated reception position and a coordinate value of a starting point which is a localization point closest to the coordinate value of the arrival point among the localization points within the signal strength distribution is minimized, and the moving node may start from the starting point, turn a route of a route form, and arrive at the arrival point corresponding to a geographically identical position to the starting point.

The estimating of the reception position may include measuring strength of at least one signal that is transmitted from the at least one fixed node; generating a change pattern of at least one signal strength according to a relative change of a position of a moving node over a plurality of time points from the measured at least one signal strength and the relative position of the estimated moving node; and estimating the reception position, based on a comparison between the change pattern of the generated at least one signal strength and distribution of signal strength in the region.

The generating of the change pattern of the at least one signal strength may generate the change pattern of the at least one signal strength by accumulating pattern data representing a pattern of at least one signal strength that is received from the at least one fixed node at the estimated relative position, on pattern data with respect to a relative position which is estimated before the relative position is estimated. The generating of the change pattern of the at least one signal strength may generate the pattern data from spatial domain data representing the measured each signal strength in association with the estimated relative position.

The measuring of the signal strength, the estimating of the relative position, the generating of the pattern, and the correcting of the relative position may be repeatedly performed for each of the plurality of time points, and the creating of the map may represent the route of the region by arranging and recording coordinate values of a plurality of relative positions that are corrected at the plurality of time points, and may generate the map by mapping to the coordinate values of the relative positions that are corrected at the each time point and recording strength of at least one signal that are received at the same point of the each time point.

According to another aspect of the present invention, there is provided a computer-readable recording medium including a program for causing a computer to perform the SLAM method.

According to still another aspect of the present invention, there is provided a SLAM (simultaneous localization and mapping) apparatus of a moving node including a relative localization unit that estimates a relative position of the moving node, based on motion sensing of the moving node; a wireless localization unit that estimates a reception position of the moving node for a signal that is received at a current time point among a plurality of time points, based on a change pattern of at least one signal strength which is received over the plurality of time points; a position correction unit that correcting the estimated relative position by correcting a coordinate value of the estimated relative position using a coordinate value of the estimated reception position; and a map creation unit that creates a map for a region by representing a route of the region in which the moving node is located by using the corrected relative position.

The wireless localization unit may include a signal processing unit that measures strength of at least one signal which is transmitted from the at least one fixed node; a pattern generation unit that generates a change pattern of at least one signal strength according to a relative change of a position of a moving node over the plurality of time points from the measured at least one signal strength and the relative position of the estimated moving node; and a reception position estimation unit that estimates the reception position of the moving node, based on a comparison between the change pattern of the generated at least one signal strength and signal strength distribution in the region.

The SLAM apparatus may further include a buffer that accumulates pattern data which is generated by the pattern generation unit, and pattern generation unit may generate the change pattern of the at least one signal strength by accumulating pattern data representing a pattern of at least one signal strength that is received from the at least one fixed node at the estimated relative position on pattern data which is stored in the buffer and storing the accumulated data.

The SLAM apparatus may further include a storage that stores a map representing distribution of signal strength in the region, the wireless localization unit may estimate the reception position, based on a comparison between the change pattern of the signal strength and the signal strength distribution of the map stored in the storage.

Advantageous Effects a relative position of a moving node is estimated based on motion sensing of the moving node, the relative position of the moving node is corrected based on a comparison between a change pattern of at least one signal strength received over a plurality of time points and a signal strength distribution in a region in which the moving node is located, a route of the region is represented by using the relative position corrected as described above, and thereby, it is possible accurately estimate a position of the moving node and to create a map in which very accurate route information is recorded throughout the entire region at the same time, even if a wireless environment change such as signal interference between communication channels, expansion of an access point, and occurrence of a failure or an obstacle is made or a poor wireless environment such as lack of the number of access points occurs. In this way, since position estimation of the moving node and map creation can be performed at the same time, time and cost consumed in the map creation can be greatly reduced compared with a method in which a person directly collects terrain information or signal information.

A reception position of the moving node is estimated for at least one signal received at a current time point among a plurality of time points, based on a comparison between a change pattern of at least one signal strength received over the plurality of time points and signal strength distribution in a region where the moving node is located, a coordinate value of a relative position of the moving node is corrected by using a coordinate value of the reception position estimated in this way, and thereby, it is possible to accurately estimate a position of the moving node and to simultaneously create a map in which very accurate route information is recorded throughout the entire region by performing mutual complementing between defects in the relative localization and defects in the wireless localization even in various environment changes such as a wireless environment change and a route change.

Unlike the SLAM of related art, a physical landmark is not required, and instead, similarity between a change pattern of at least one signal strength received over a plurality of time points and a corresponding pattern in signal strength distribution in a region in which the moving node is located serves as a kind of landmark, and thus, it is possible to estimate a position of the moving node and simultaneously create a map, based on pattern similarity which is much lower in complexity than image processing of the SLAM of related art. As a result, a SLAM algorithm can be executed smoothly without a separate sensor for identifying a physical landmark even in a small and light moving node such as a smartphone.

Even in a case where the position of the moving node is estimated by using a radio signal having almost no change in signal strength over a wide area, such as an LTE signal, a position of the moving node can be accurately estimated by using the change pattern of at least one signal strength received over a plurality of time points. This is because, even if there is almost no change in the signal strength between the adjacent localization points on a movement route of the moving node, strength of the LTE signal sufficiently changes to the extent that the position of the moving node is accurately estimated within a movement distance corresponding to a length of a change pattern of the signal strength used for the wireless localization of the present invention.

Since the position of the moving node can be accurately estimated by using the LTE signal in which the signal strength rarely changes between the measurement points on the movement route, it is possible to create a map that can cover an indoor space and an outdoor space. As a result, it is possible to provide a map in which indoor and outdoor localization with high accuracy can be made in an urban area without influence of a high-rise building by using LTE signals widely distributed in the building and in an inner city, and thereby, it is possible to replace a GPS-based map which is most widely used in a vehicle navigation system nowadays but cannot be used for indoor localization and has seriously degraded localization accuracy in the center of a city, and to accelerate realization of fully autonomous travel in outdoor and indoor spaces.

DESCRIPTION OF THE DRAWINGS

FIGS. 7A and 7B are table forms illustrating accumulation of pattern data used for SLAM according to the present embodiment.

FIGS. 10A to 11B are diagrams illustrating examples in which a received position of the moving node is estimated in accordance with the SLAM algorithm according to the present embodiment.

FIGS. 11A and 11B are diagrams illustrating an example in which accuracy of an absolute position estimated by the wireless localization algorithm according to the present embodiment is lowered.

FIGS. 14A to 15F are diagrams illustrating a comparison between a SLAM performance test for a wireless localization algorithm of related art and a SLAM performance test for the wireless localization algorithm according to the present embodiment.

MODE OF THE INVENTION

Hereinafter, embodiments of the present invention will be described in detail with reference to the drawings. Hereinafter, all moving objects, which are localization targets, such as a smartphone carried by a user, a navigation system mounted on a vehicle, and a moving robot that moves by itself as an independent object will be collectively referred to as a moving node. In addition, communication devices, which are fixedly installed in regions and relay wireless communication of a moving node, such as an access point (AP) of a WiFi network and a base station of an LTE network, will be collectively referred to as a "fixed node". In addition, a radio frequency (RF) signal transmitted from the fixed node will be briefly referred to as a "signal".

An embodiment of the present invention that will be described below relates to simultaneous localization and mapping (SLAM) method and apparatus which can estimate a position of a moving node in an unknown environment and create a map for the unknown environment at the same time, and particularly, to SLAM method and apparatus robust to a wireless environment change which can accurately estimate a position of a moving node and can create a map with very accurate route information throughout the entire region at the same time, even if a wireless environment change such as signal interference between communication channels, expansion of an access point, and occurrence of a failure or an obstacle is made or a poor wireless environment such as lack of the number of access points occurs, and can accurately estimate the position of the moving node without a separate sensor for identifying a physical landmark and create a map with very accurate route information throughout the entire region at the same time. Hereinafter, the SLAM method and the SLAM apparatus will be briefly referred to as a "SLAM method" and a "SLAM apparatus".

Figure 1:
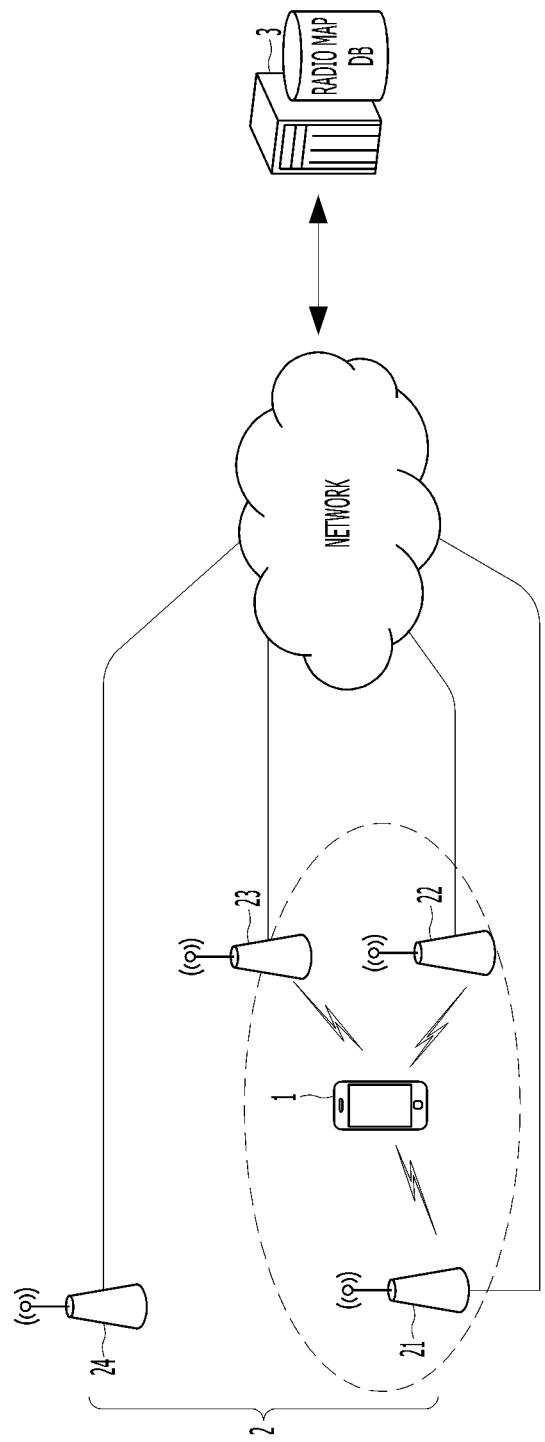
FIG. 1 is a configuration diagram of a wireless communication system according to an embodiment of the present invention.

FIG. 1 is a configuration diagram of a wireless communication system according to an embodiment of the present invention. Referring to FIG. 1, the wireless communication system according to the present embodiment is configured with a plurality of moving nodes 1, a plurality of fixed nodes 2, and a localization server 3. Each of the plurality of moving nodes 1 performs wireless communication with another node through at least one type of wireless communication network while moving in a state of being carried by a user or mounted on a vehicle or moving by itself as an independent object. In general, each moving node 1 performs wireless communication through at least two types of wireless communication networks, for example, a Wi-Fi network and an LTE network. Each of the plurality of fixed nodes 2 relays the wireless communication of each moving node 1 such that each moving node 1 can access the wireless communication network to perform wireless communication with nodes. In a case where the moving node 1 performs wireless communication through the Wi-Fi network, the fixed node may be an access point, and in a case where the moving node performs the wireless communication through an LTE network, the fixed node may be a base station.

The localization server 3 stores a map provided from at least one of the plurality of moving nodes 1. Any one of the plurality of moving nodes 1 can create a map of the entire region where the wireless localization service will be provided and provide the map to the localization server 3. The region where the wireless localization service will be provided can be divided and be assigned to each of the plurality of moving nodes 1. Each moving node 1 can create a map of the regions which will be assigned to each moving node 1 and provide the map to the localization server 3. The localization server 3 can complete the map of the entire region where the wireless localization service will be provided by combining the maps provided from the plurality of moving nodes 1. The localization server 3 provides the stored map to the moving node which will perform wireless localization. As described below, the map stored in the localization server 3 includes many reference points and a kind of radio map in which signal strengths at each reference point are recorded, the map can also be used for other general wireless localization, in addition to the wireless localization based on a surface correlation according to the present embodiment.

Figure 2:
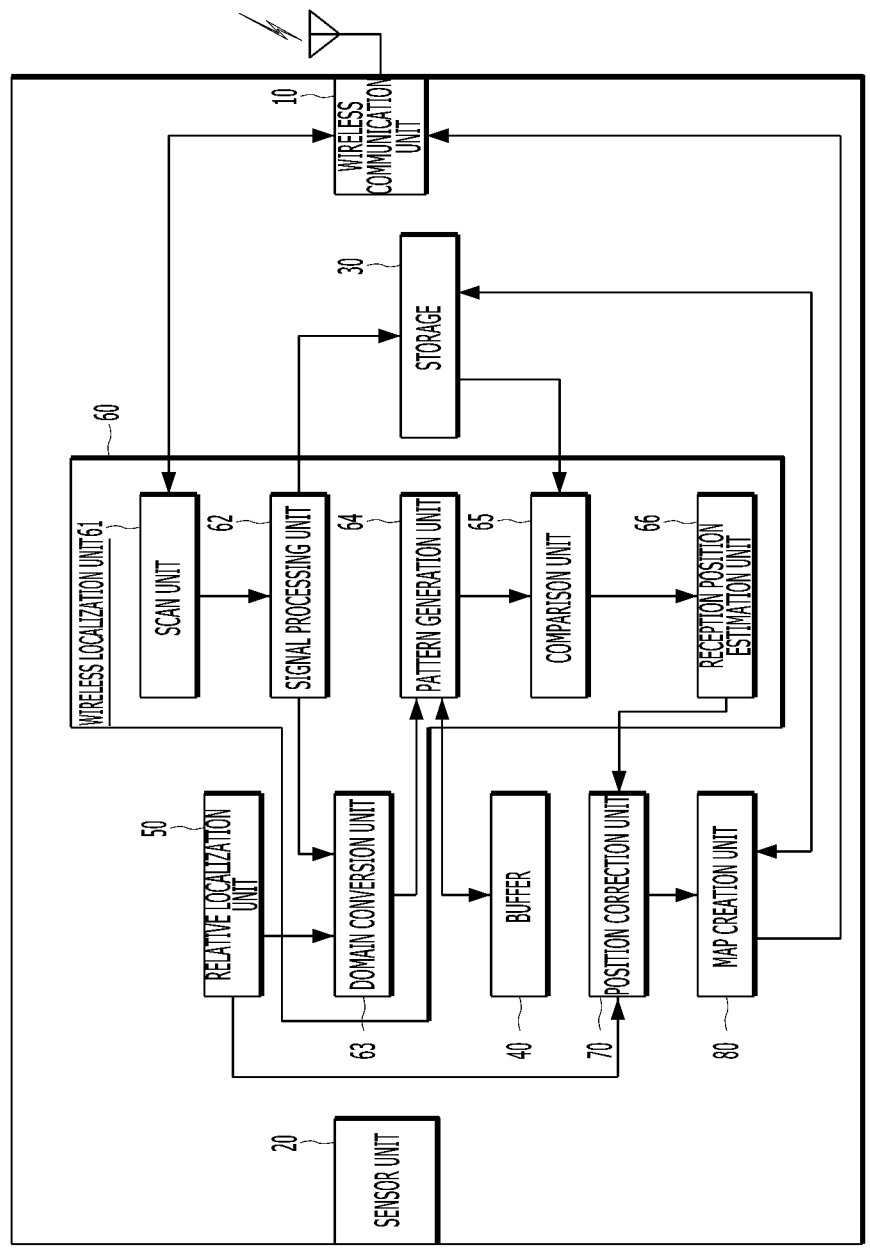
FIG. 2 is a configuration diagram of a SLAM apparatus of a moving node illustrated in FIG. 1.

FIG. 2 is a configuration diagram of the SLAM apparatus of the moving node 1 illustrated in FIG. 1. Referring to FIG. 2, the SLAM apparatus of the moving node 1 illustrated in FIG. 1 includes a wireless communication unit 10, a sensor unit 20, a storage 30, a buffer 40, a relative localization unit 50, a wireless localization unit 60, a position correction unit 70, and a map creation unit 80. Those skilled in the art will appreciate that such configuration elements may be realized by hardware which provides a particular function or may be realized by a combination of a memory, a processor, a bus, and the like in which software providing a particular function is stored. Each of the above-described configuration elements is not necessarily realized by separate hardware, and a plurality of the configuration elements may be realized by common hardware, for example, a combination of a processor, a memory, a bus, and the like.

As described above, the moving node 1 may be a smartphone carried by a user, may be a navigation system mounted on a vehicle, or may be a moving robot which moves by itself as an independent object. The embodiment illustrated in FIG. 2 relates to a SLAM apparatus, and if other configurations of a smartphone, other configurations of a navigation system, or other configurations of a moving robot are illustrated in FIG. 2, in addition to the configuration of the SLAM apparatus illustrated in FIG. 2, characteristics of the present embodiment may be degraded, and thus, the other configurations are not illustrated. Those skilled in the art will understand that, in a case where the moving node 1 is realized by the smartphone, the navigation system, or the moving robot, other configuration elements besides the configuration elements illustrated in FIG. 2 can be added.

The wireless communication unit 10 transmits and receives signals through at least one wireless communication network. The sensor unit 20 includes at least one sensor which senses movement of the moving node 1. The sensor unit 20 may include an acceleration sensor that measures an acceleration of the moving node 1 and a gyro sensor that measures an angular velocity of the moving node 1. A sensor type of the sensor unit 20 may be changed depending on what type of device the moving node 1 is configured. In a case where the moving node 1 is configured by a smartphone, the sensor unit 20 may be configured by an acceleration sensor and a gyro sensor described above. In a case where the moving node 1 is configured by a navigation system mounted on a vehicle, the sensor unit 20 may be configured by the acceleration sensor and the gyro sensor described above, and an encoder, a geomagnetic sensor, and the like may be used instead of the sensors.

Figure 3:
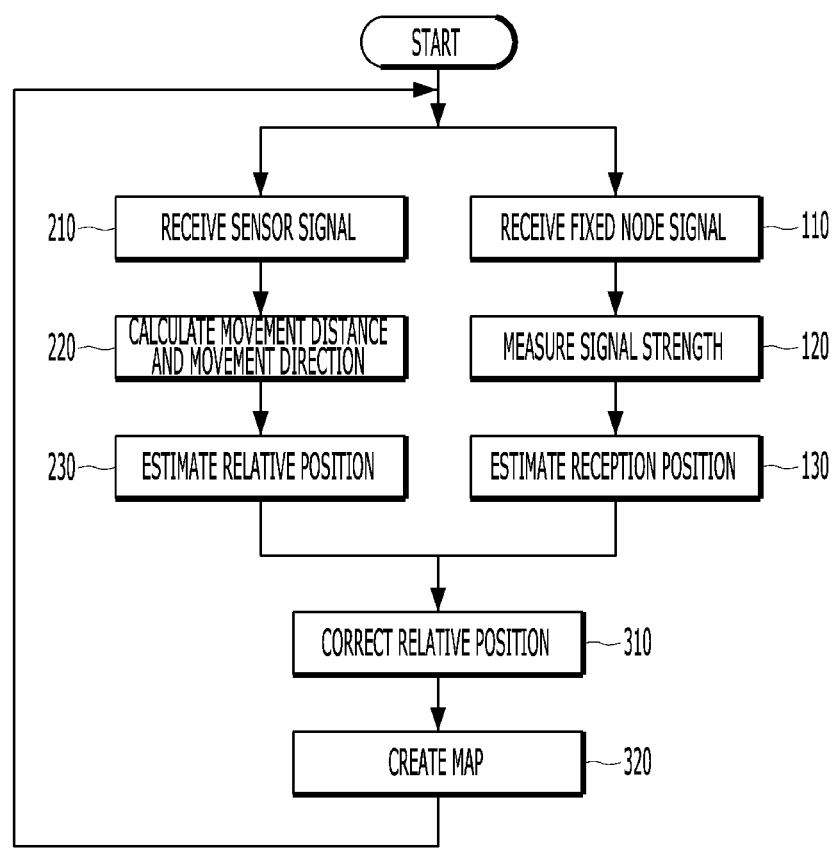
FIG. 3 is a flowchart of a SLAM method according to an embodiment of the present invention.

The storage 30 stores a map representing a signal strength distribution in a region where the moving node 1 is located. Here, the region where the moving node 1 is located indicates a region (hereinafter, simply referred to as "target region") that becomes a target of map creation and may be a small region such as an indoor space of a certain building or may be a large region such as the center of a city. In a case where the moving node 1 is going to create a map for a certain region, the moving node 1 collects strengths of signals transmitted from all the fixed nodes 2 in the region while travelling through all the routes in the region and can store a distribution map of the collected signal strengths in the storage 30. The signal strength distribution map stored in the storage 30 through a process in which the SLAM method illustrated in FIG. 3 is repeatedly performed is updated by the number of travels of the entire route, while the moving node 1 travels all the routes in the target region several times. In this way, the signal strength distribution map stored in the storage 30 is provided to the localization server 3.

Each time the moving node 1 travels the entire route in the target region once, the map stored in the storage 30 is updated, and accuracy of the map stored in the storage 30 is gradually increased by updating the map. The accuracy of the map stored in the storage 30 is increased as the number of travels of the entire route is increased, but the map takes a long time to complete, and thus, it is preferable that the number of travels of the entire route is determined by considering the accuracy and required time of the map stored in the storage 30. The signal intensity distribution map may be stored in the storage 30 by being represented in a form of a table in which numerical values of the respective signal strengths are grouped and may be stored in the storage 30 by being represented in a form of a graph pattern in which dots or bars representing respective signal strengths are connected.

It is preferable that the map is stored in the storage 30 in a form of an electronic table so as to provide a map in a form of a general wireless map that can be used for other general wireless localization in addition to the wireless localization based on the surface correlation in the present embodiment. Hereinafter, a point at which a relative position of the moving node 1 is measured on a movement route of the moving node 1 moving around the target region for the purpose of creating the map is referred to simply as a "localization point". The localization point may be referred to as a reference point in a field of a radio map of a fingerprint and may be referred to as a node in a SLAM field of a moving robot. The buffer 40 is used for accumulating pattern data generated by the pattern generation unit 15.

The relative localization unit 50 estimates a relative position of the moving node 1 on the basis of motion sensing of the moving node 1 made by the sensor unit 20. The relative localization unit 50 can estimate the relative position of the moving node 1 using a pedestrian dead reckoning (PDR) algorithm or a dead reckoning (DR) algorithm widely known in the art to which the present embodiment belongs. The wireless localization unit 60 estimates a received position of the moving node 1 for a signal received at a current time point among a plurality of time points on the basis of a change pattern of at least one signal strength received from over a plurality of time points which are the current time point and at least one past time point. Here, the relative position of the moving node 1 means a relative position with respect to other positions of the moving node 1, and the reception position of the moving node 1 means a current position of the moving node 1 that receives at least one signal transmitted from at least one fixed node 2 around the moving node 1. Referring to FIG. 2, the wireless localization unit 60 is configured with a scan unit 61, a signal processing unit 62, a domain conversion unit 63, a pattern generation unit 64, a comparison unit 65, and a reception position estimation unit 66.

FIG. 3 is a flowchart of a SLAM method according to an embodiment of the present invention. Referring to FIG. 3, the SLAM method according to the present embodiment is configured by the following steps performed by the SLAM apparatus of the moving node 1 illustrated in FIG. 2. Hereinafter, the relative localization unit 50 and the wireless localization unit 60 which are illustrated in FIG. 2 will be described in detail with reference to FIG. 3. In step 110, the scan unit 61 of the wireless localization unit 60 of the moving node 1 periodically scans a frequency band of the wireless communication through the wireless communication unit 10, thereby, receiving at least one signal transmitted from at least one fixed node 2. A sampling rate of time domain data which will be described below is determined according to a length of a scan period of the scan unit 61. The shorter the scan period of the wireless communication unit 10, the higher the sampling rate of the time domain data which will be described below, and as a result, precision of a reception position of the moving node 1 estimated according to the present embodiment can be improved.

Since an ID of the fixed node 2 is included in a signal transmitted from a certain fixed node 2, it is possible to know the ID of the fixed node 2 from the signal transmitted from the fixed node 2. In a case where only one fixed node 2 exists within a communicable range at a current position of the moving node 1, the wireless communication unit 10 receives one signal from one fixed node 2 through a scanning process. In a case where a plurality of fixed nodes 2 exist within the communicable range at the current position of the moving node 1, the wireless communication unit 10 receives a plurality of signals corresponding to the plurality of fixed nodes 2 from the plurality of fixed nodes 2 through the scanning process. FIG. 1 illustrates an example in which the moving node 1 receives three signals from three fixed nodes 21, 22, and 23. It can be seen that the other fixed node 24 is located outside the communicable range of the moving node 1. Since the present embodiment can be applied to a region where a wireless communication infrastructure is relatively well equipped, the moving node 1 mostly receives signals of the plurality of fixed nodes 2, but a signal of one fixed node 2 can also be received at some regions where the wireless communication infrastructure is weak. Meanwhile, in a case where no signal is received in the scanning process, the localization itself required for the SLAM according to the present embodiment is impossible, and thereby, the moving node 1 waits until receiving the signal of the fixed node 2.

In step 120, the signal processing unit 62 of the wireless localization unit 60 of the moving node 1 measures strength of each signal received in step 110. In step 130, the wireless localization unit 60 of the moving node 1 estimates the reception position of the moving node 1 for a signal received from at least one fixed node 2 at a current time point on the basis of a change pattern of at least one signal strength received from at least one fixed node 2 around the moving node 1 over a plurality of time points. Here, the change pattern of the at least one signal strength received from at least one fixed node 2 over the plurality of time points is a change pattern of at least one signal strength according to a relative change of a position of the moving node 1 over a plurality of time points.

In step 210, the relative localization unit 50 of the moving node 1 periodically receives an output signal of the sensor unit 20. In step 220, the relative localization unit 50 of the moving node 1 calculates a movement distance and a movement direction of the moving node 1 from a value of the output signal of the sensor unit 20 received in step 210. In step 230, the relative localization unit 50 of the moving node 1 calculates a relative change of a current position of the moving node 1 with respect to a previous position of the moving node 1 on the basis of the movement distance and the movement direction of the moving node 1 calculated in step 220, thereby, estimating the current relative position of the moving node 1 with respect to the previous position of the moving node 1. As described above, since a sensor type of the sensor unit 20 can be changed depending on what type of device the moving node 1 is configured, different navigation algorithms can be used for estimating the relative position of the moving node 1 depending on what type of device the moving node 1 is configured.

For example, in a case where the moving node 1 is a smartphone, the relative localization unit 50 may estimate the relative position of the moving node 1 using a PDR algorithm. More specifically, the relative localization unit 50 can calculate a movement distance of the moving node 1 by integrating a value of an output signal of an acceleration sensor of the sensor unit 20, and can calculate a movement direction in the moving node 1 by integrating a value of an output signal of a gyro sensor in the moving node 1. In a case where the moving node 1 is mounted on a vehicle as a navigation system, the relative localization unit 50 can estimate the relative position of the moving node 1 using a DR algorithm. For example, the relative localization unit 50 can calculate the movement distance and the movement direction of the moving node 1 by attaching the acceleration sensor and the gyro sensor of the sensor unit 20 to a wheel of a vehicle. In this way, since the PDR and DR algorithms for estimating the relative position of the moving node 1 estimate the relative position of the moving node 1 through integration of the values of the output signals of the sensors, as estimation of the relative position is repeated, errors of the relative position of the moving node 1 are accumulated.

Figure 4:
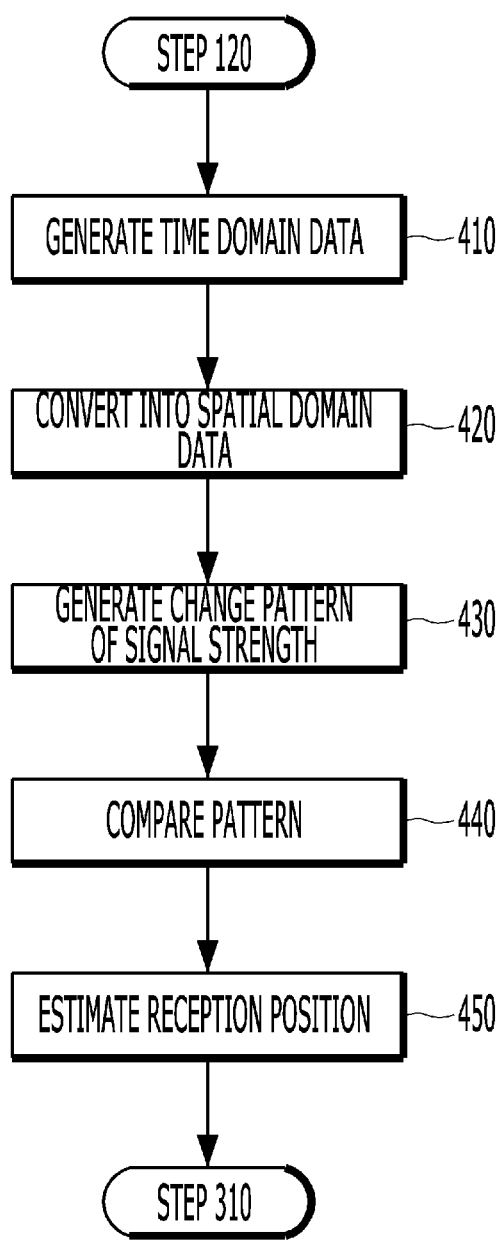
FIG. 4 is a detailed flowchart of step 130 illustrated in FIG. 3.

FIG. 4 is a detailed flowchart of step 130 illustrated in FIG. 3. Referring to FIG. 3. in step 410, the signal processing unit 62 of the wireless localization unit 60 of the moving node 1 generates time domain data representing each signal strength measured in step 120 in association with any one time point. Here, any one time point is used as information for distinguishing the signal received in step 110 from the signal received previously or the signal received thereafter. This time point may be reception time point of each signal. The reception time point of each signal may be a time point when the signal processing unit 62 reads time of an internal timepiece of the moving node 1 at the moment when each signal is input from the wireless communication unit 10.

In more detail, in step 410, the signal processing unit 62 generates time domain data including at least one signal strength set $\{RSS_{mn}, \dots\}_{TD}$ in which an ID of the fixed node 2 that transmits each signal for each signal received in step 110, a reception time point of each signal, and strength of each signal measured in step 120 are grouped into one set. Here, RSS is an abbreviation of "Received Signal Strength", TD is an abbreviation of "Time Domain", a subscript "m" indicates a sequence number of the ID of the fixed node 2, and "n" indicates a sequence number of the reception time point of each signal.

For example, if the SLAM method illustrated in FIG. 3 is repeatedly implemented three times, the scan unit 61 scans peripheral signals three times. If the scan unit 61 receives only one signal transmitted from the fixed node 2 having the second ID when scanning a third signal, the time domain data includes only one signal strength set $RSS_{23}$. If the scan unit 61 receives a signal transmitted from the fixed node 2 having the second ID and a signal transmitted from the fixed node 2 having a third ID when scanning the third signal scan, the time domain data includes the signal strength set $RSS_{23}$ and $RSS_{33}$.

In this way, the time domain data can be regarded as data for dividing the strength of each signal measured in step 120 into an ID of the fixed node 2 transmitting each signal in a time domain and a reception time point of each signal. Whenever the SLAM method according to the present embodiment is implemented, the reception time points of a plurality of signal strength sets $\{RSS_{mn}, \ldots\}_{TD}$ included in the time domain data generated in step 410 are all the same. Accordingly, in order to reduce a length of the time domain data, IDs of a plurality of fixed nodes and a plurality of signal strengths may be arranged and attached to each other at one time point for the signals collected at the same point or time. It will be understood by those skilled in the art that the time domain data can be represented in various formats other than the above-described format.

In step 420, the domain conversion unit 63 of the wireless localization unit 60 of the moving node 1 converts the time domain data generated in step 130 into spatial domain data in which strength of each signal measured in step 120 is represented in association with the relative position of the moving node 1 estimated in step 220. In more detail, the domain conversion unit 63 converts the time domain data into at least one signal strength set $\{RSS_{mn}, \ldots\}_{SD}$ in which IDs of the fixed nodes 2, the relative position of the moving node 1, and the strengths of each signal are grouped into one set by replacing reception time point of each signal with the relative position of the moving node 1 corresponding to the reception time point of each signal, among the IDs of the fixed nodes 2, the reception time point of each signal, and the strength of each signal which is represented by each set $RSS_{mn}$ for each set of at least one signal strength set $\{RSS_{mn}, \ldots\}_{TD}$ included in the time domain data generated in step 130.

Here, RSS is an abbreviation of "Received Signal Strength", SD is an abbreviation of "Space Domain", a subscript "m" represents a sequence number of the IDs of the fixed nodes 2, and "n" represents a sequence number of the relative positions of the moving node 1 corresponding to the sequence number of the reception time points of each signal. In a case where reception of the signal in step 110 and reception of the signal in step 210 are performed at substantially the same time in synchronization with each other, the relative positions of the moving node 1 corresponding to the reception time points of each signal may be the relative positions of the moving node 1 estimated in the reception time points of each signal. In this case, the sequence number of the reception time points of each signal is the sequence number of the relative positions of the moving node 1 as it is. For example, the signal strength set $RSS_{23}$ included in the spatial domain data indicates the strength of a signal received from the fixed node 2 having the second ID when the relative localization unit 50 estimates the third relative position.

If the reception of the signal in step 110 and the reception of the signal in step 210 are not synchronized with each other, the relative position of the moving node 1 corresponding to the reception time point of each signal may be the relative position estimated nearest to the reception time point of each signal among the relative positions estimated in multiple time points. In this way, the time domain data is time-based data in which the strength of each signal is associated with the reception time point of each signal by grouping the ID of the fixed node 2, the reception time point of each signal, and the strengths of each signal into one set, whereas the spatial domain data is a space-based data in which the strength of each signal is associated with the relative position of the moving node 1 by grouping the ID of the fixed node 2 included in the time domain data, the relative position of the moving node 1 estimated in the time point included in the time domain data, and the strength of each signal included in the time domain data into one set.

Since the reception time points of a plurality of signal strength sets $\{RSS_{mn}, \ldots\}_{TD}$ included in the time domain data generated in step 410 are all the same each time the SLAM method according to the present embodiment is implemented, the relative positions of the plurality of signal strength sets $\{RSS_{mn}, \ldots\}_{SD}$ included in the spatial domain data converted in step 3420 are all the same each time the SLAM method is implemented. Accordingly, in order to reduce a length of the spatial domain data, IDs of a plurality of fixed nodes and strengths of a plurality of signals may be arranged and attached to one relative position for the signals collected at the same relative position. It will be understood by those skilled in the art that spatial domain data can be expressed in various formats besides the above-described format.

in step 430, the pattern generation unit 64 of the wireless localization unit 60 of the moving node 1 generates a change pattern of at least one signal strength according to a relative change of the position of the moving node over a plurality of time points from the at least one signal strength measured in step 120 and the relative position of the moving node 1 estimated in step 230. In more detail, the pattern generation unit 64 generates a pattern of at least one signal strength currently received in step 110 from at least one signal strength measured in step 120 and the relative position of the moving node 1 estimated in step 230, and successively arranges the pattern of the currently received at least one signal in a pattern of at least one signal received before the reception time point of the signal in step 110, thereby, generating the change pattern of the at least one signal strength according to the relative change of the position of the moving node 1 over a plurality of time points.

The SLAM method according to the present embodiment is a method for repeatedly estimating a current position of the moving node 1 in real time when the moving node 1 moves to a certain route and simultaneously creating a map of the route where the moving node 1 travels at the same time, and, while the SLAM apparatus illustrated in FIG. 2 is being driven, the steps illustrated in FIGS. 3 and 4 are continuously repeated. Since the moving node 1 cannot know signal strength distribution in a target region when first passing through a certain route in the target region in order to collect signal strengths to be stored in the storage 30, the wireless localization according to the present embodiment is not possible, and thus, execution of steps 130 and 310 is omitted.

That is, when the moving node 1 first passes through a certain route in the target area, steps 210, 220, 230, 110, 120, and 320 are repeatedly performed for the number of times of relative localization on the route in order to collect the signal strength at various localization points on the route and create a signal intensity distribution map for the route. As a result, when the moving node 1 first completes travel of a certain route in the target area, the relative position value of the moving node 1 representing the route is stored in the storage 30 as a value in an uncorrected state. When the moving node 1 completes a certain route in the target area for the first time or when the moving node completes the route several times, only whether or not the relative position of the moving node 1 is corrected is different, but a format of the map stored in the storage 30 is the same, and the map stored in the storage 30 is updated by the number of times of completion of the route.

More specifically, when the moving node 1 first passes through a certain route in the target area, steps 210, 220 and 230 are performed to estimate a current relative position of the moving node 1 and to perform steps 110 and 120 at the same time, and thereby, strength of at least one signal received from the fixed node 2 around the moving node 1 is measured. The moving node 1 stores the estimated relative position and the measured signal strength in the storage 30 as signal strength at the relative position. The moving node 1 creates a signal intensity distribution map for the route by representing the route as a coordinate value and signal strength of the relative position in each of a plurality of localization points on the route estimated or measured while taking a turn in the route. That is, if a process in which the moving node 1 records the coordinate value and the signal strength of the relative position at each localization point in a form of a numerical value of a table or a graph of a three-dimensional space in the storage 30 while sequentially passing through a plurality of localization points on the route is completed for the entire route, the storage 30 stores a signal intensity distribution map for the route.

For example, in a case where the relative localization unit 50 estimates the relative position of the moving node 1 using a PDR algorithm, each localization point on the route may be a step of each user. In this way, since the relative position of the moving node 1 is measured at a very short interval of approximately 1 meter, a continuous arrangement of a plurality of localization points forms a specific route. The moving node 1 repeats the above process for all the routes in the target area, and thereby, the signal intensity distribution map for the entire target area is completed and stored in the storage 30. According to the present embodiment, the moving node 1 improves accuracy of coordinate values of each localization point through a process in which the moving node updates the coordinate values of each localization point each time when travelling the route while travelling the route several times, thereby optimizing a graph of the route represented in a plurality of localization points so as to approach an actual route.

Figure 5:
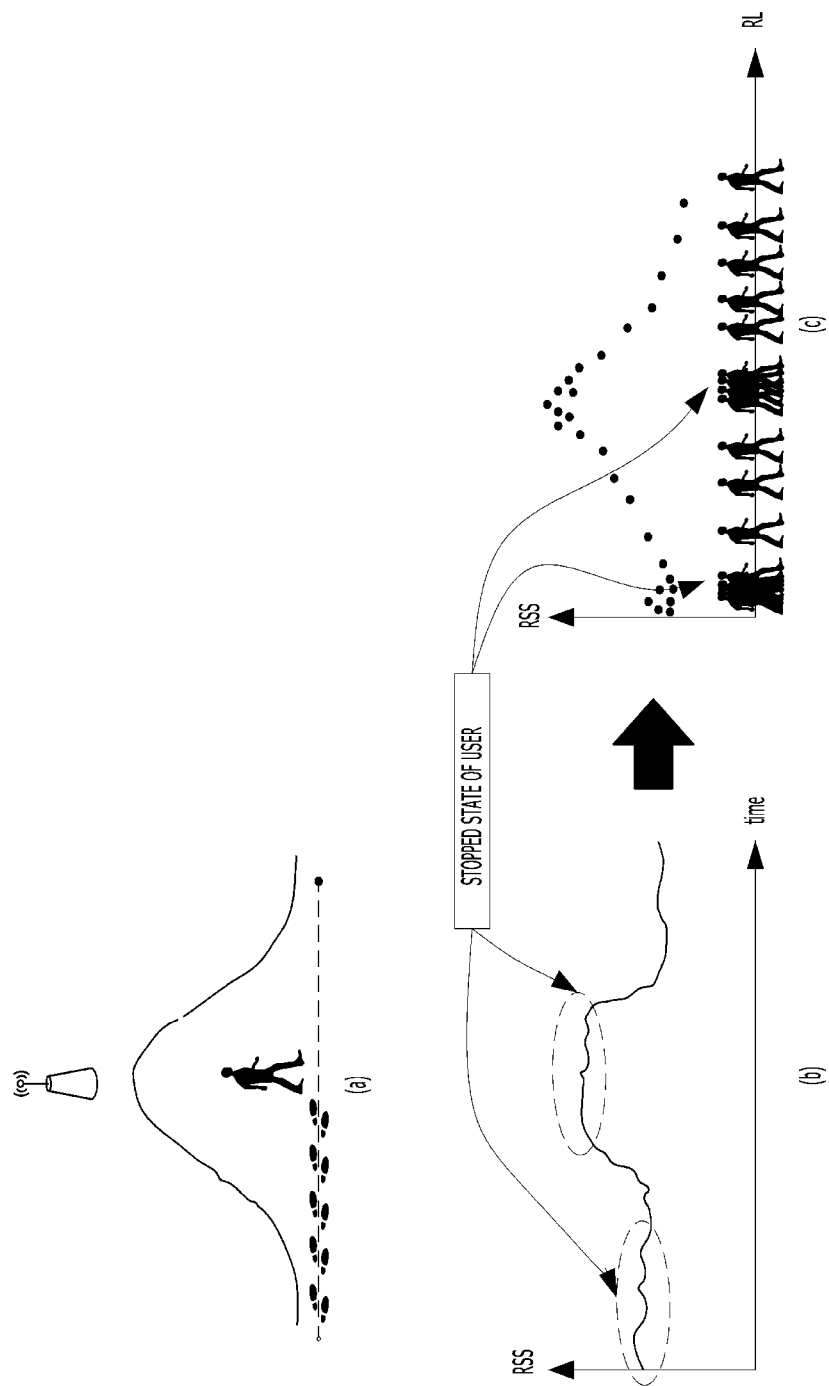
FIG. 5 is a diagram illustrating a pattern formation principle in step 430 of FIG. 4.

FIG. 5 is a diagram illustrating a pattern formation principle in step 430 of FIG. 4. Referring to (a) of FIG. 5, a strength of a signal transmitted from the fixed node 2 is attenuated approximately in inverse proportion to square of a distance from the fixed node 2. In a case where a user approaches and moves away from the fixed node 2, the moving node 1 carried by the user receives a signal having the strength illustrated in (a) of FIG. 5. In general, the user does not constantly walk at a constant speed and may stop temporarily while walking. While the user temporarily stops, even if the SLAM method illustrated in FIG. 3 is repeatedly implemented many times, the strength of the signal transmitted from the fixed node 2 is measured approximately the same as illustrated in (b) of FIG. 5. The x-axis in (b) of FIG. 5 represents a time point when the signal strength is measured, and the y-axis represents the signal strength. The x-axis in (c) of FIG. 5 represents a relative position (RL) of the moving node 1 and the y-axis represents the signal strength.

Since the strength of the signal transmitted from the fixed node 2 is measured each time the SLAM method illustrated in FIG. 3 is implemented, the strength of the signal transmitted from the fixed node 2 is not represented in a continuous curve shape as illustrated in (b) of FIG. 5, and is actually represented in a shape in which dots represented at a height corresponding to the strength of the signal are continuously arranged. If a reception point to time of each signal is replaced with the relative position of the moving node 1 by the domain conversion unit 63, change patterns of the signal strength generated by the pattern generation unit 64 are represented as continuous arrangement of the signal strengths received a plurality of times at a plurality of relative positions of the moving node 1 estimated at a plurality of time points as illustrated in (c) of FIG. 5. Accordingly, it can be said that the change pattern of at least one signal strength generated by the pattern generation unit 64 is a change pattern of at least one signal strength represented as continuous arrangement of at least one signal strength received a plurality of times.

The storage 30 stores a map in a form of a table representing distribution of signal strengths collected in the target area according to the SLAM method according to the present embodiment, or a map of a graphic shape representing a distribution pattern of signal strength. When a user repeatedly moves through the same route several times, times necessary for moving the entire route is generally different from each other. In a case where movement routes of a user are the same, even if the times necessary for moving the entire route are different, several positions of the user on the route are the same. Accordingly, reflecting a reception time point of the signal transmitted from the fixed node 2 in the map is not only impossible, but also unnecessary. That is, the map according to the present embodiment is represented by an ID of the fixed node 2 from which a signal is transmitted with respect to many signals collected in the entire target region, a position of a point at which the signal is received, and a signal strength distribution to which the signal strengths are reflected.

In order to estimate the reception position of the moving node 1 for the signal received at a current time point in accordance with the present embodiment, a pattern that can be matched to the signal strength distribution map has to be generated. Since localization of the moving node 1 is performed in a state where a position of the moving node 1 is not known, the moving node 1 generates time domain data representing each signal strength in association with a reception time point of each signal, and thereafter, converts the time domain data into spatial domain data in which each signal strength is associated with the relative position of the moving node 1 corresponding to the reception time point of each signal. In order to determine coordinates of the map, a target region of the real world in which the moving node 1 moves around is divided into a grid structure in which distances between scales are constant. Since a value of a position of a certain point on the map is represented by two-dimensional coordinates having a resolution of this unit.

As illustrated in (c) of FIG. 5, as a user is in a temporarily stopped state, a plurality of dots representing the strength of a plurality of signals received at a plurality of relative positions of the moving node 1 may be concentrated. In this case, if a maximum distance between the plurality of concentrated dots is within a distance corresponding to a coordinate resolution unit of the map, that is, a resolution unit of coordinates for representing the relative position of the moving node 1, there is an effect that the plurality of concentrated dots represent one signal strength as one dot, which causes a change pattern of the signal strength to be generated. For example, if the coordinate resolution unit of the map is 1 meter, there is an effect that several dots concentrated within one meter represent one signal strength as one dot, which causes a change pattern of the signal strength to be generated.

In step 430, the pattern generation unit 64 generates a pattern of at least one signal strength received from at least one fixed node 2 at a relative position of the moving node 1 estimated in step 230, from the spatial domain data converted in step 420. In step 323, the pattern of at least one signal strength generated by the pattern generation unit 64 is a pattern of at least one signal strength generated by representing at least one signal strength represented by spatial domain data for at least one fixed node represented by the spatial domain data at a relative position represented by the spatial domain data of a movement route of the moving node 1. In step 323, the pattern generation unit 64 generates the pattern of at least one signal strength by generating a signal strength graph representing a signal strength of each signal strength set $RSS_{mn}$ for each signal strength set $RSS_{mn}$ of at least one signal strength set $\{RSS_{mn}, \ldots\}_{SD}$ included in the spatial domain data received in step 310.

Figure 6:
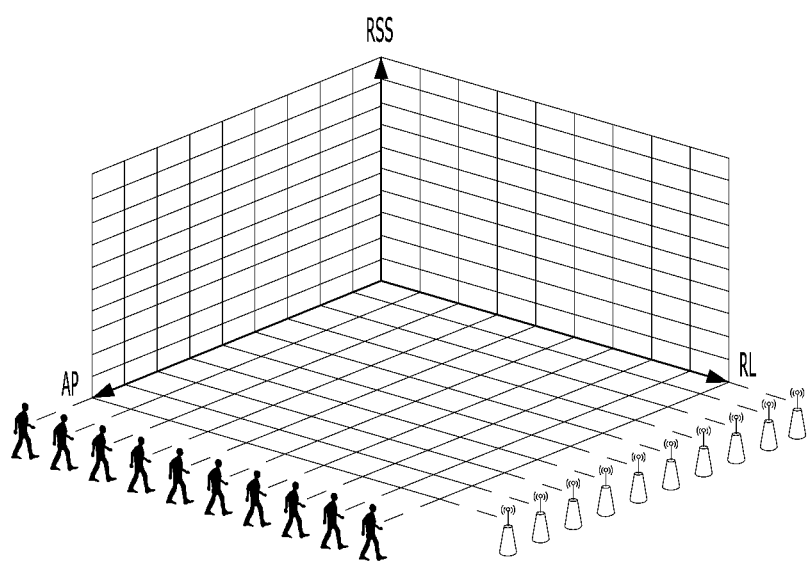
FIG. 6 is a diagram illustrating a three-dimensional spatial coordinate system for generating a change pattern of a signal strength used for a SLAM algorithm according to the present embodiment.

FIG. 6 is a diagram illustrating a three-dimensional spatial coordinate system for generating a change pattern of a signal strength used for the SLAM method according to the present embodiment. Referring to FIG. 6, the x-axis of a three-dimensional space is a coordinate axis in which IDs of a plurality of fixed nodes 2 are arranged at a regular interval, the y-axis is a coordinate axis in which a movement route of the moving node 1 is divided into resolution units of coordinates for representing the relative position of the moving node 1, and the z-axis is a coordinate axis in which a measurement range of the strength of a signal received from the plurality of fixed nodes 2 is divided into measurement resolution units of the signal strength. It will be understood by those skilled in the art that information represented by each of the x-axis, the y-axis, and the z-axis of the three-dimensional space can be exchanged with each other. For example, the x-axis may represent the relative position of the moving node 1, and the y-axis may represent the ID of the fixed node 2.

The three-dimensional spatial coordinate system illustrated in FIG. 6 is based on the assumption that a movement route of a user or a vehicle is determined as in a case of a road in the center of a city, and in a case where a signal strength distribution map stored in the storage 30 is built based on collected signals while moving along a route determined as such, a signal strength distribution of a map includes a movement route represented in arrangement of a signal reception positions. That is, in a case where the change pattern of a current signal strength of the moving node 1 coincides with a pattern of a certain part of the signal strength pattern in the map, it is possible to know a point of the movement route where the moving node 1 is located by comparing with the signal strength distribution in the map. In a case where the movement route of the moving node 1 is not determined or a height of the moving node 1 is estimated in addition to the position of the moving node 1 on the ground, It may be necessary to generate a change pattern of at least one signal strength received in step 110 for multi-dimensional spatial coordinate system higher than four-dimensional spatial coordinate system.

In order to facilitate understanding of the present embodiment, ten access points corresponding to the fixed node 2 of a Wi-Fi network are arranged in the x-axis of FIG. 6, and users carrying the moving nodes 1 are arranged at a length of 10 meter at intervals of 1 meter. Accordingly, the resolution unit of the relative position coordinates of the moving node 1 is 1 meter. As described below, the change pattern of the signal strength compared with a signal strength distribution map stored in the storage 30 in step 440 is a three-dimensional pattern generated in the three-dimensional space of a size illustrated in FIG. 6. That is, the size of the three-dimensional space illustrated in FIG. 6 means that a change pattern of signal strength compared with the signal strength distribution map stored in the storage 30 is generated at intervals of 10 meters with respect to a route where the moving node 1 moves during the localization according to the present embodiment. At this time, the number of access points on the movement route of the moving node 1 is 10. The three-dimensional spatial coordinate system illustrated in FIG. 6 is only an example, and the number of access points and the length of the movement route of the moving node 1 may be variously modified and designed.

In step 430, the pattern generation unit 64 generates a graph illustrating the signal strength of the signal strength set $RSS_{mn}$ in such a manner that a dot is marked on a point of a three-dimensional space determined by mapping an ID of the fixed node represented by any one of the signal strength sets $RSS_{mn}$ for each signal strength set $RSS_{mn}$ included in the spatial domain data converted in step 420 on the x-axis of a three-dimensional space, mapping the relative position of the moving node 1 represented by the strength set $RSS_{mn}$ on the y-axis, and mapping strength of the signal represented by the signal strength set $RSS_{mn}$ on the z-axis. The signal strength graph is not an image output graph to be shown to a user, but is a graphical element at an intermediate stage for illustrating a process of generating a change pattern of a signal strength in the form of a three-dimensional graph used for wireless localization. However, in order to facilitate understanding of the present embodiment, description will be hereinafter made below by assuming that a signal strength graph for each signal strength set $RSS_{mn}$, a pattern of the signal strength at a relative position, and a change pattern of a signal strength according to a change in the relative position can be visually recognized.

As described above, the pattern of at least one signal strength generated by the pattern generation unit 64 means a pattern of at least one signal strength representing at least one signal strength represented by the spatial domain data in accordance with an ID of at least one fixed node represented by the spatial domain data and a relative position represented by the spatial domain data. Accordingly, if the moving node 1 receives only one signal, the pattern of the signal strength at the relative position of the moving node 1 estimated in step 230 may be one dot shape. If the moving node 1 receives a plurality of signals, the pattern of the signal strength at the relative position of the moving node 1 estimated in step 230 may be a linear line shape or a curved shape represented by a plurality of adjacent dots.

In step 430, the pattern generation unit 64 accumulates pattern data representing the pattern of at least one signal strength generated in this way on the pattern data stored in the buffer 40 and store the accumulated data. The pattern data stored in the buffer 40 is pattern data with respect to a relative position estimated before the relative position is estimated in step 230. The change pattern of at least one signal strength measured in step 120 is generated by accumulating the pattern data. The pattern data necessary for generating the change pattern of the signal strength compared with a signal strength distribution of the map stored in the storage 30 can be accumulated in the buffer 40, and a larger amount of pattern data can be accumulated. In the latter case, the change pattern of the signal strength is generated from a part of the pattern data accumulated in the buffer 40.

FIGS. 7A and 7B are table forms illustrating the accumulation of pattern data used for the SLAM according to the present embodiment. In FIG. 7A, the pattern data accumulated in the buffer 40 is represented in a table form. In step 430, the pattern generation unit 64 may accumulate the spatial domain data in the buffer 40 in the table form of FIG. 7A. In the table of FIG. 7A, a value "m" of "APm" corresponds to coordinate values of the x-axis in a three-dimensional space as a sequence number of IDs of the fixed nodes 2, a value "n" of "RLn" corresponds to coordinate values of the y-axis in the three-dimensional space as a sequence number of relative positions of the moving node 1, and "$RSS_{mn}$" corresponds to coordinate values of z-axis in the three-dimensional space as strengths of signals which are transmitted from the fixed nodes 2 having IDs "APm" and are received at relative positions "RLn" of the moving node 1.

According to the pattern generating method of the pattern generation unit 64 described above, since a dot is represented at a height corresponding to the value "$RSS_{mn}$" at a point of a two-dimensional plane determined by the value "m" of "APm" and the value "n" of "RLn", a set of "$RSS_{mn}$" illustrated in FIG. 7A forms a geometric surface in the three-dimensional space. As described above, in step 430, the pattern generation unit 64 generates a three-dimensional pattern of a geometric surface shape that graphically representing a change of at least one signal strength according to a relative change of a position of the moving node 1 in such a manner that a dot is marked on a point of the three-dimensional space determined by mapping the ID of one fixed node on the x-axis of the three-dimensional space, mapping the relative position of the moving node 1 on the y-axis, and mapping the strength of a signal which is transmitted from the fixed node and is received at the relative position on the z-axis. A plurality of signal strength sets included in the spatial domain data accumulated in the buffer 40 may not accumulate in the buffer 40 in the table form of FIG. 7A and may be accumulated in the buffer 40 in various forms for efficient use of a memory space.

Figure 8:
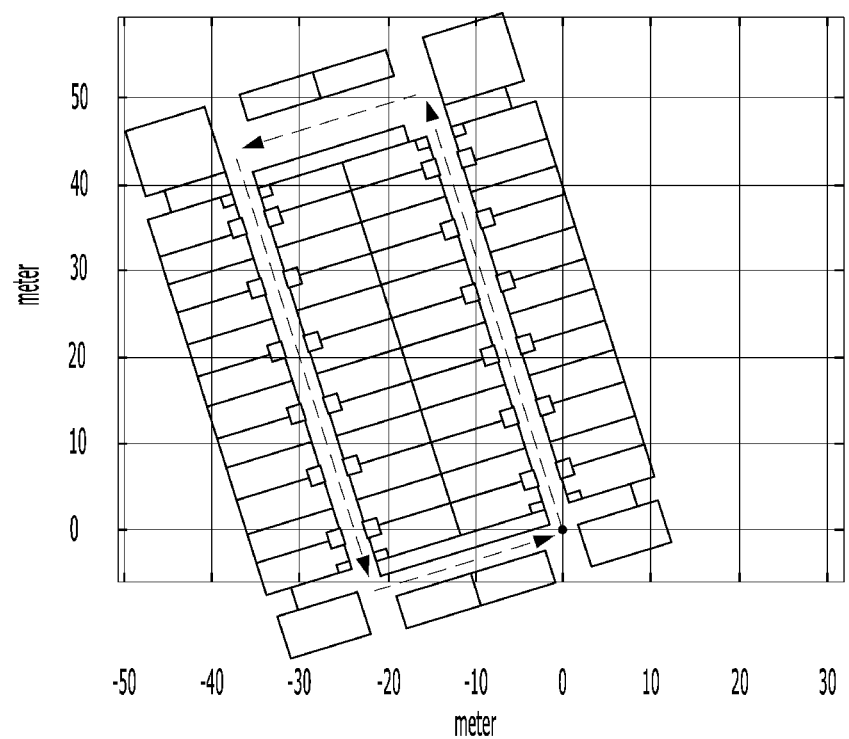
FIG. 8 is a diagram illustrating an example of a target region of map creation according to the SLAM of the present embodiment.

FIG. 8 is a diagram illustrating an example of a target region of map creation according to the SLAM of the present embodiment. In the example of FIG. 8, the target area of map creation according to the SLAM of the present embodiment is an indoor space of a building, and a corridor of the building has a rectangular perimeter shape. A user started from a starting point marked by a dot in FIG. 8 carrying a smartphone which is the moving node 1 and arrived at the starting point by taking a turn in the corridor counterclockwise. At this time, the moving node 1 starts from the starting point (0, 0) and moves along dotted lines illustrated in FIG. 8. In the present embodiment, a position of the moving node 1 is represented by a two-dimensional coordinate value of a two-dimensional coordinate system.

Since the moving node 1 determines a direction where the moving node proceeds based on compass information, in a case where a side of the building is inclined with respect to the north-south direction of a compass, a plane of the building may be displayed on a two-dimensional coordinate system of a map created by the moving node 1 in a tilted state as illustrated in FIG. 8. The three-dimensional spatial coordinate system illustrated in FIG. 6 has to be distinguished from a two-dimensional coordinate system of a map created according to the SLAM algorithm according to the present embodiment, as a spatial coordinate system for generating a signal intensity change pattern of a three-dimensional surface shape. That is, a value of the relative position of the moving node 1 mapped to the y-axis of the three-dimensional space illustrated in FIG. 6 is represented by a coordinate value of the two-dimensional coordinate system illustrated in FIG. 8.

The SLAM or related art estimated the position of the moving node based on several physical landmarks. Examples of the landmarks are a door, a stair, and the like of a building having a characteristic shape without changing a position thereof. A sensor such as a LiDAR, a camera, or an ultrasonic sensor is required to identify the landmarks. The LiDAR is very high in resolution, but is expensive and there is a limit to miniaturization, thereby, being difficult to be applied to a small moving node (1) such as a smartphone. In the same manner, It is difficult for a camera to be applied to a smartphone having a low image data processing capability because an output thereof is image data. An ultrasonic sensor can be miniaturized, but has very low resolution, and thereby, there is a limit to creating a map with high accuracy. The SLAM according to the present embodiment does not require a landmark described above, unlike the SLAM of related art, and instead. similarity between the signal intensity change pattern generated by the pattern generation unit 64 and a corresponding pattern in the signal strength distribution of a map stored in the storage 30 serves as a kind of landmark.

In this way, since the present embodiment can estimate the position of the moving node 1 based on the similarity of a pattern with a very low complexity as compared with image processing of the SLAM of related art and generate a map at the same time, the SLAM method according to the present embodiment can be implemented smoothly without a separate sensor for identifying a physical landmark even in the light, thin, short, and small moving node 1. Particularly, a map created by the SLAM method according to the present embodiment has an advantage that can be used for wireless localization in general because the map includes a signal intensity distribution corresponding to a kind of radio map in addition to a physical terrain such as a route of a target area.

As described above, since the moving node 1 cannot know a signal intensity distribution inside the building when taking a turn in the corridor of the building illustrated in FIG. 8 for the first time, wireless localization cannot be performed, and thus, execution of step 130 and 310 of FIG. 3 is omitted. In the example illustrated in FIG. 8, the moving node 1 moves according to walking of a user, and thereby, the relative localization unit 50 estimates a relative position of the moving node 1 using the PDR algorithm, and each localization point on the route becomes each step of the user. That is, the moving node 1 estimates the relative position of the moving node 1 at each step of the user by performing steps 210, 220. and 230 for each step of the user, and simultaneously measures strength of at least one signal received at each step position of the user by performing steps 110 and 120. The moving node 1 represents a corridor route as a coordinate value of a relative position and signal strength in each of a plurality of steps on the corridor route while taking a turn in the corridor of the building, thereby creating a signal intensity distribution map for the route.

As a result, the storage 30 stores a signal intensity distribution map for a route. Unlike the example illustrated in FIG. 8, the signal intensity distribution map can be created and stored in the storage 30 in the same manner for each route even in a case where there are multiple routes in the target area. Since it can be seen that the signal intensity distribution map represents a change pattern of signal intensity only in a certain route, the map data stored in the storage 30 can be generated in the same format as the pattern data accumulated in the buffer 40. In this way, if a format of the pattern data accumulated in the buffer 40 is the same as a format of the map data stored in the storage 30, the pattern data accumulated in the buffer 40 and the map data stored in the storage 30 are coincide with each other.

In FIG. 7B, the map data stored in the storage 30 is represented in a form of a table having the same format as the format illustrated in FIG. 7A. A value "m" of "APm" is a sequence number of an ID of the fixed node 2 installed in the target area, a value "n" of "ALn" is a sequence number of a reception position of the moving node 1, and "$RSS_{mn}$" is strength of a signal transmitted from the fixed node 2 having an ID of "APm" and received at the reception position "ALn" of the moving node 1, in the table of FIG. 7B. Since the reception position of the moving node 1 is estimated not by a relative position with respect to other positions of the moving node 1 but by a position where a corresponding pattern coinciding most closely with a change pattern of the signal strength generated by the pattern generation unit 64 is located in the signal intensity distribution map stored in the storage 30, the reception position of the moving node 1 can be referred to as a kind of an absolute location (AL) in terms of being in contrast with the relative position of the moving node 1. Accordingly, the reception position of the moving node 1 is denoted as an absolute position in the table of FIG. 7B.

As described above, the format of the map data stored in the storage 30 is the same as the format of the pattern data accumulated in the buffer 40. Accordingly, description of the map data stored in the storage 30 will be replaced with description of the pattern data of the buffer 40 described above. Since the signal intensity distribution map generated according to the SLAM algorithm according to the present embodiment includes a kind of radio map created by storing strengths of many signals collected in the target region in a database, a value "$RSS_{mn}$" of FIG. 7B is represented as a specified value.

Figure 9:
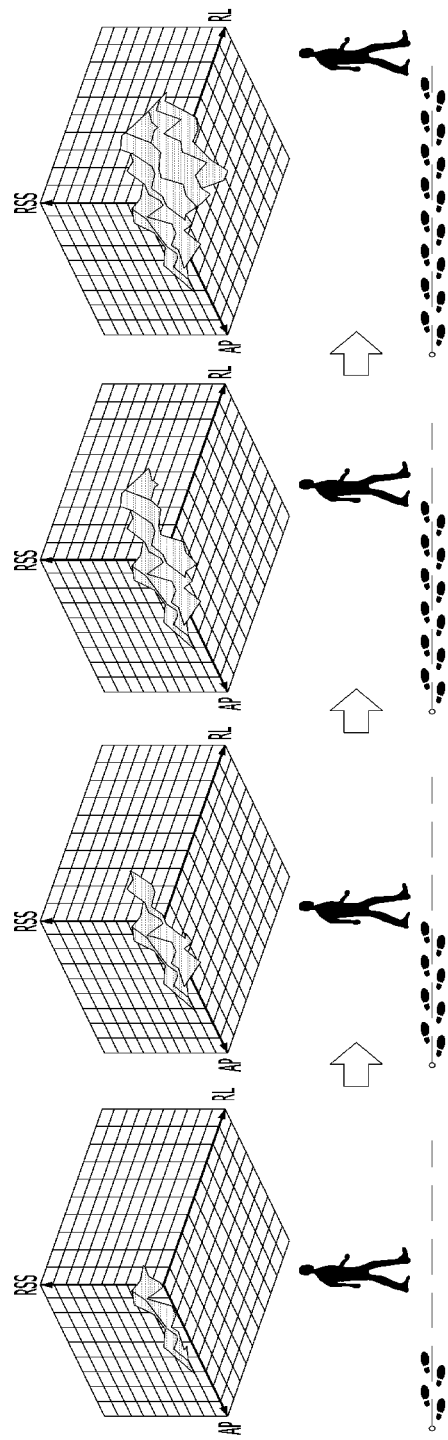
FIG. 9 is a diagram illustrating an example in which a change pattern of signal strength used for the SLAM according to the present embodiment is generated.

FIG. 9 is a diagram illustrating an example in which the change pattern of the signal strength used for the SLMA according to the present embodiment is generated. When a user moved by 20 meters along the corridor of the building illustrated in FIG. 8 under the assumption that a scale of the three-dimensional spatial coordinate system illustrated in FIG. 9 is 10 times a scale of the three-dimensional spatial coordinate system illustrated in FIG. 6, the relative position of the moving node 1 is estimated 20 times and a three-dimensional pattern of a surface shape corresponding to the movement distance is generated by a pattern at each of the 20 relative positions, according to a pattern generation technique of the pattern generation unit 64 described above. A surface illustrated in FIG. 9 is formed by concentrated dots of heights different from each other. It can be seen that, when a user moves 40 meters, 60 meters, and 80 meters, the three-dimensional pattern of the surface shape is expanded by the amount of addition of the movement distance. A curvature of the surface is generated due to a strength difference between signals transmitted from the adjacent fixed nodes 2, that is, a difference between adjacent "$RSS_{mn}$".

In step 440, the comparison unit 65 of the wireless localization unit 60 of the moving node 1 compares a change pattern of at least one signal strength generated in step 430 with signal strength distribution of a map stored in the storage 30, thereby, searching a part having a pattern most similar to the change pattern of at least one signal strength generated in step 430 within the signal strength distribution of the map stored in the storage 30. As described above, the signal strength distribution of the map stored in the storage 30 indicates signal strength distribution in a region where the moving node 1 is located, that is, a region which becomes a target of map creation. More specifically, the comparison unit 65 compares a three-dimensional pattern of a geometric surface shape graphically representing a change of at least one signal strength generated in step 430 with a three-dimensional pattern of a geometric surface shape graphically representing the signal strength distribution of the map stored in the storage 30, thereby, searching a surface part having a shape most similar to the surface shape of the three-dimensional pattern graphically representing the change of at least one signal strength generated in step 430 within the signal strength distribution of the map stored in the storage 30.

In a case where the map data stored in the storage 30 is represented in the form of the table of the format illustrated n FIG. 7B, a three-dimensional pattern of the geometric surface shape graphically representing the signal intensity distribution of a map needs to be generated from the map data stored in the storage 30. In this case, the pattern generation unit 64 generates a three-dimensional pattern in a form of a geometric surface shape graphically representing a change of at least one signal intensity according to a relative change in a position of the moving node 1, and simultaneously generates a three-dimensional pattern of geometric surface shape graphically representing the signal intensity distribution of the map stored in the storage 30. That is, the pattern generation unit 64 generates a three-dimensional pattern of a geometric surface shape graphically representing signal intensity distribution of the map stored in the storage 30 in such a manner that dots are displayed at points in a three-dimensional space determined by mapping IDs of one fixed node on the x-axis of a three-dimensional space, mapping absolute positions having signal strength information in the map on the y-axis, and mapping strength of a signal which is transmitted from the fixed node and is received at the absolute position on the z-axis with reference to the table illustrated in FIG. 7B.

The pattern generation unit 64 may generate a three-dimensional pattern of a geometric surface shape graphically representing all or a part of the signal intensity distribution of a map stored in the storage 30. In a case where a size of the target region is small, even if all of the signal intensity distribution of the map stored in the storage 30 is represented as a graph, there is almost no problem in the data processing of the moving node 1. In a case where the size of the target region is large, if all of the signal intensity distribution of the map stored in the storage 30 is represented as a graph, the moving node 1 may take a heavy load. The pattern generation unit 64 can set a pattern region including a current position of the moving node 1 based on the ID of at least one fixed node 2 that transmits the signals scanned by the scan unit 61, within the map stored in the storage 30, and can generate a three-dimensional pattern of a geometric surface shape graphically representing the signal intensity distribution of the pattern regions set in this way. The size of the pattern region has to be appropriately set such that an error does not occur in the estimated value of the reception position of the moving node 1 due to the size thereof without greatly influencing the load of the moving node 1.

As described above, the present embodiment determines where the change pattern of at least one signal strength generated in step 430 is located within the signal strength distribution of the map stored in the storage 30, based on a surface correlation between the change pattern of at least one signal strength generated in step 430 and the distribution pattern of the signal strength of the map stored in the storage 30. For example, the surface correlation may be calculated by using a three-dimensional shape matching algorithm known to those skilled in the art to which the present embodiment belongs.

In step 450, the reception position estimation unit 66 of the wireless localization unit 60 of the moving node 1 estimates a reception position of the moving node 1 for at least one signal received in step 110, based on a comparison between the change pattern of the signal strength generated in step 430 and the signal intensity distribution in the region where the moving node 1 is located. Here, the signal intensity distribution in the region where the moving node 1 is located is the signal intensity distribution of the map stored in the storage 30. More specifically, in step 450, the reception position estimation unit 66 estimates an absolute position in the region where the moving node 1 is located, which is indicated by the part searched by the comparison in step 440, that is, the estimated surface part, as the reception position of the moving node (1) for at least one signal received in step 110. Here, the absolute position in the region where the moving node 1 is located indicates a position in the coordinate system of the signal intensity distribution map stored in the storage 30.

In this way, the present embodiment does not consider only the currently received signal strength like the related art, but estimates the reception position of the moving node 1 using the change pattern of at least one signal strength according to the relative change of the position of the moving node 1 over the plurality of time points so far unlike the related art, and thereby, if a length of the change pattern of the signal strength is set to be very long, a real-time nature of the localization of the moving node 1 may be degraded. However, a shape similarity between the surface representing the change pattern of the signal strength up to a current position of the moving node 1 and the surface representing a pattern of the signal strength distribution of the map stored in the storage 30 can be rapidly determined by using the three-dimensional shape matching algorithm, and thereby, the real-time nature of the localization of the moving node 1 may be guaranteed even in a case where the length of the change pattern of the signal strength over the plurality of time points is very long.

Figure 10:
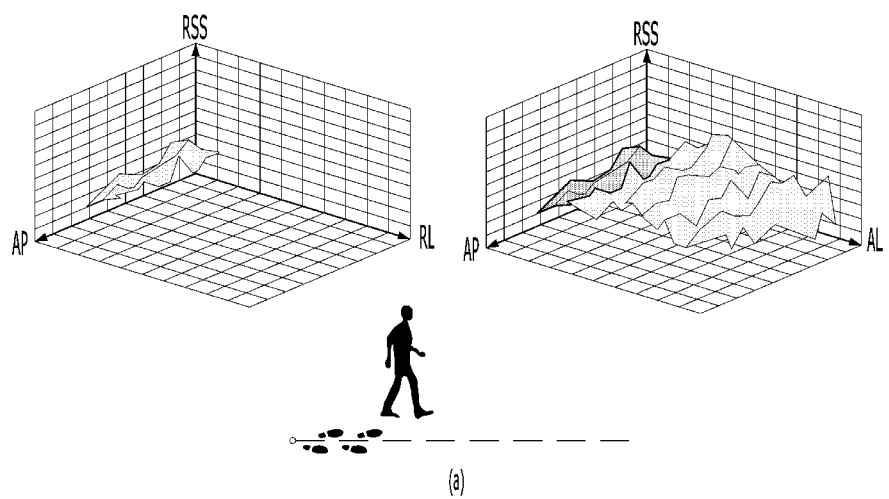
Figure 10:
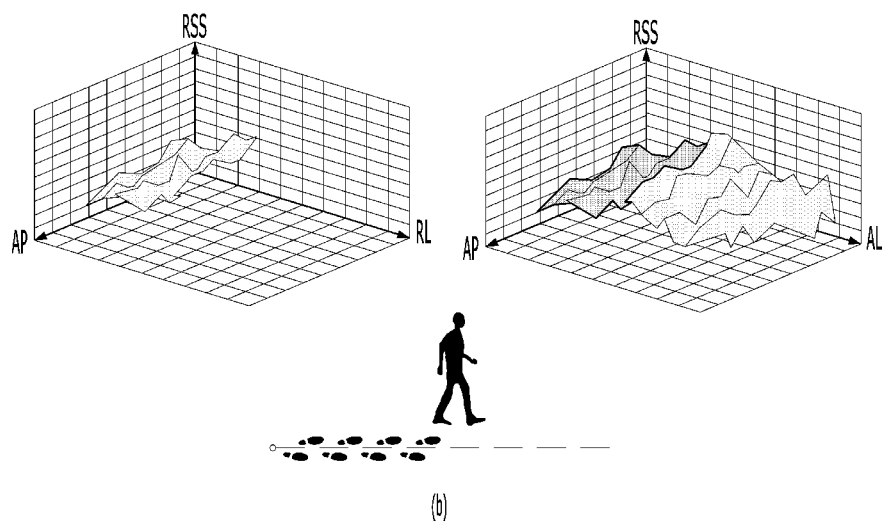
Figure 11:
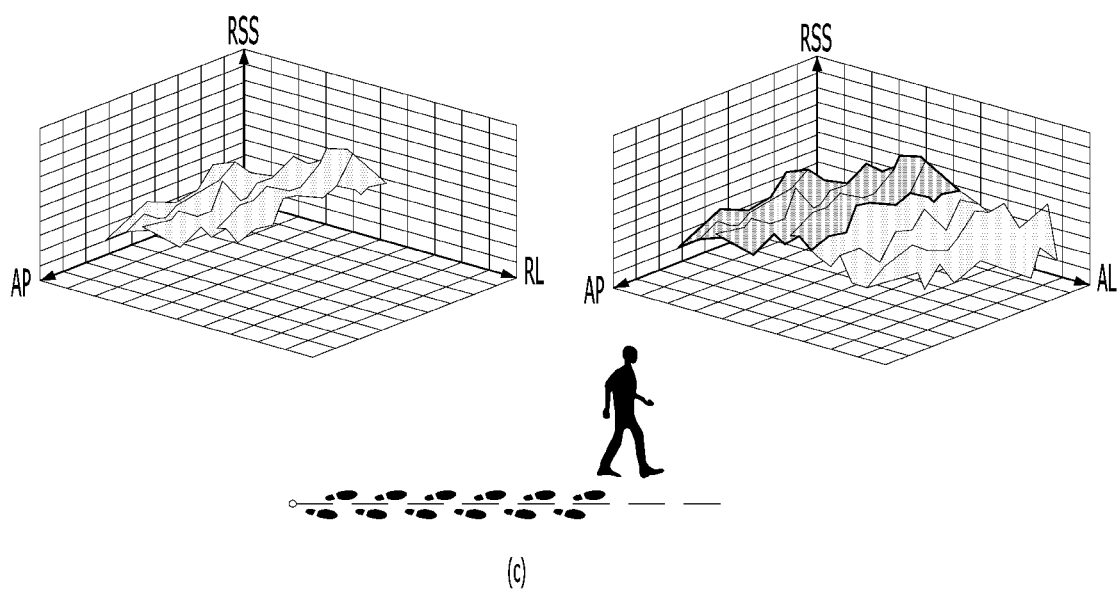
Figure 11:
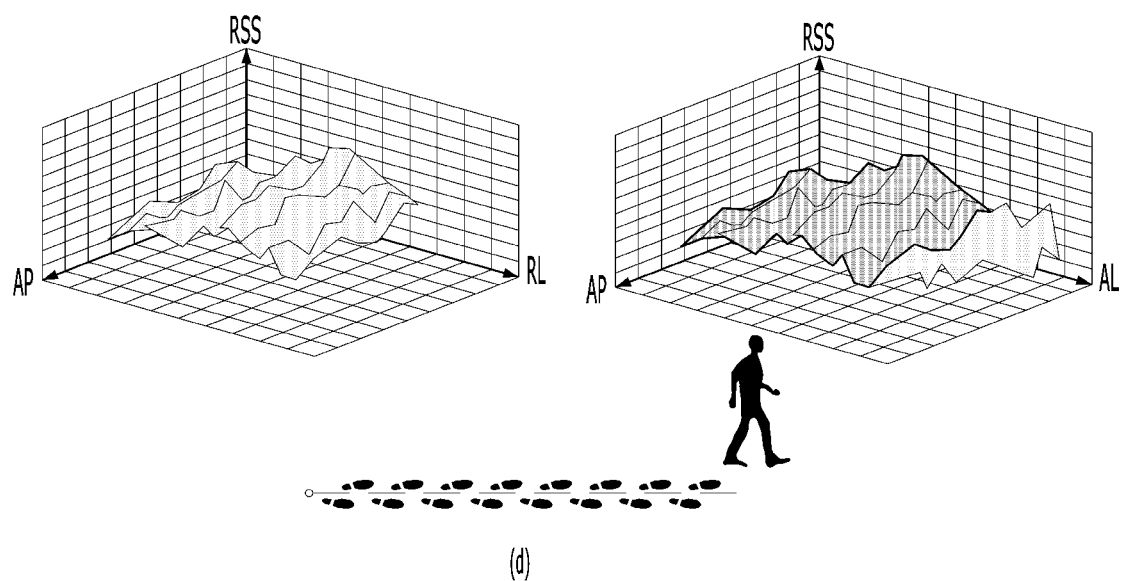

FIGS. 10A to 11B are diagrams illustrating examples in which a reception position of the moving node 1 is estimated in accordance with the SLAM algorithm according to the present embodiment. Scales of the three-dimensional spatial coordinate system illustrated in FIGS. 10A to 11B are the same as the scale of the three-dimensional space coordinate system illustrated in FIG. 6, and pattern examples based on the relative positions of the moving node 1 illustrated on the left side of FIGS. 10A to 11B are the same as the example illustrated in FIG. 9. Pattern example of based on the absolute positions of maps illustrated on the right side of FIGS. 10A to 11B illustrate maps of the distribution pattern of the signal strength for a movement route up to 100 meters. A map stored in the storage 39 is much larger than the maps illustrated on the right side of FIGS. 10A to 11B, but only a part relating to the matching with the patterns illustrated on the left side of FIGS. 10A to 11B in the map stored in the storage 30 is illustrated on the right side of FIGS. 10A to 11B due to limitation of a size of paper. When a user moves by 20 meters, a three-dimensional pattern of a surface shape illustrated on the left side of FIG. 10A is generated.

According to a matching method based on the surface correlation described above, the comparison unit 65 searches a boldly-marked part in the pattern map illustrated on the right side of FIG. 10A. Likewise, when a user moves 40 meters, 60 meters, and 80 meters, three-dimensional patterns of a surface shape illustrated on the left sides of FIG. 10B, FIG. 11A, and FIG. 11B are sequentially generated. The comparison unit 65 sequentially searches the boldly-marked parts in the pattern maps illustrated on the right sides of FIG. 9B, FIG. 10C, and FIG. 10D. The reception position estimation unit 66 estimates the relative position estimated in step 230 among a plurality of absolute positions of a part found out in step 440, that is, a plurality of absolute positions of the surface part, that is, the absolute position corresponding to the last estimated relative position, as the reception position of the moving node 1. A correspondence relationship between the relative position and the absolute position is determined from a shape matching relationship between the two surfaces. That is, the reception position estimation unit 66 estimates an absolute position of the part having a shape most similar to the shape of the relative position estimated in step 230 among a plurality of absolute positions of the surface part found out in step 440, as the reception position of the moving node 1.

Various wireless localization algorithms including a k-nearest neighbor (KNN) algorithm widely known as a wireless localization technology of related art, a particle filter algorithm, and an algorithm obtained by combining a particle filter and PDR estimate the position of the moving node 1 in common using only the currently received signal strength. In a case where a signal strength different from the signal strength received at the time of creating a map is measured due to a wireless environment change such as signal interference between communication channels, expansion of an access point, and occurrence of a failure or an obstacle, points adjacent to each other in the map have a similar signal strength distribution, and thereby, the wireless localization algorithm of related art has a very high probability that a current position of the moving node 1 is estimated to be an adjacent position other than an actual position thereof. The larger the difference between the strength of the signal received at the time of creating the map and the strength of the currently received signal, the greater the localization error.

As described above, the SLAM algorithm according to the present embodiment estimates the reception position of the moving node 1 using the change pattern of at least one signal strength according to the relative change of the position of the moving node over a plurality of time points, and thereby, an error of the estimated value of the reception position of the moving node 1 rarely occurs, even if there occurs a wireless environment change such as signal interference between communication channels, expansion of an access point, and occurrence of a failure or an obstacle. That is, the SLAM algorithm according to the present embodiment estimates the current position of the moving node 1 receiving a certain signal, based on the change pattern of the signal strength, in consideration of not only the strength of the currently received signal but also all the past signal strengths received in the route where the moving node 1 passes through so far, and thereby, the wireless environment change in the current position of the moving node 1 rarely influences the estimation in the current position of the moving node 1.

The adjacent point of the actual position of the moving node 1, which is estimated when only the strength of the currently received signal is considered due to the wireless environment change according to the wireless localization algorithm of related art, becomes a point deviating from the route represented by the change pattern of the signal strength so far. According to the present embodiment, the wireless environment chant in the position where the moving node 1 is currently located is not able to change the entire change pattern of the signal strength received in the route where the moving node 1 passes through so far and changes a current time point of such a pattern. Accordingly, if a position of the moving node 1 is estimated by using a change pattern of at least one signal strength according to a relative change of a position of a moving node over a plurality of time points so far, there is a high possibility that an actual position of the moving node 1 receiving a current signal is estimated as a reception position of the moving node 1 rather than an adjacent position of the actual position of the moving node 1 estimated according to the wireless localization algorithm of related art. Of course, if the wireless environment change continuously occurs at various points on a movement route of the moving node 1, a localization error may occur, but this case rarely occurs.

Particularly, a strength of a signal received from a certain fixed node 2 reaches a peak when going around the fixed node, and the peak tends to be rarely influenced by the wireless environment change. Accordingly, if a length of the change pattern of the signal strength used for the SLAM according to the present embodiment is sufficiently lengthened within a limitation where a real-time nature of the localization is guaranteed such that the currently received signal includes peak parts of various signals on the route where the moving node 1 passes previously although not a part adjacent to the peak, the peak becomes very robust to the wireless environment change.

As described above, the change pattern of the signal strength used for the SLAM of the present embodiment is a three-dimensional pattern of a geometric surface shape graphically representing a change of at least one signal strength according to a relative change of a position of the moving node 1, and, when viewing from a viewpoint of comparison between a three-dimensional pattern of a surface shape of the moving node 1 and a three-dimensional pattern of a surface shape of map data, the wireless environment change in a current position of the moving node 1 results in a height error only of a surface part corresponding to the strength of the currently received signal, and does not influence most of the surfaces corresponding to points other than a point of the wireless environment change. That is, the wireless environment change in the current position of the moving node 1 does not substantially influence the entire shape of the surface, although causing some deformation of the surface shape.

Since the wireless localization algorithm of related art compares a numerical value of a currently received signal strength with a numerical value of a signal strength distributed in a radio map, it leads to a result that a point adjacent to the actual position of the moving node 1 having a numerical value most similar to the numerical value of the currently received signal strength is wrongly estimated as a position of the moving node 1. According to the SLAM algorithm according to the present embodiment, the wireless environment change in the current position of the moving node 1 rarely influences the entire shape of the surface, and thereby, when a surface part having the shape most similar to the surface shape of the three-dimensional pattern is found out in the map represented by the map data, there is a very low possibility that a surface part different from the surface part to be originally found out is found out due to an error of a strength of the currently received signal. As described above, the localization error of the algorithm of related art according to the comparison between the numerical value of the currently received signal strength and the numerical value of the signal strength distributed in the radio map can be originally blocked, and thereby, localization accuracy of the moving node 1 can be greatly improved.

Since a base station of an LTE network costs much more than an access point of a Wi-Fi network to install, the base station is installed as far as possible from an adjacent base station so as not to overlap a relay service region thereof. As a result, there are characteristics that LTE signals are uniformly distributed throughout indoor and outdoor spaces, but a region where a change of the signal strength is not large is wide.

As described above, since the wireless localization algorithm of related art estimates a position of the moving node 1 using only the currently received signal strength in common, in a case where there is almost no change in the signal strength between the localization points on a movement route of the moving node 1, not only the localization points cannot be distinguished only by the signal strength, but also the signal strength is very sensitive to peripheral noise, and thereby, a localization error becomes very larger.

Even in a case where a strength of the LTE signal rarely changes between adjacent localization points on a movement route of the moving node 1, if a length of a change pattern of a signal strength used for the wireless localization of the present embodiment is sufficiently lengthened within a limitation where a real-time nature of localization of the moving node 1 is guaranteed, a strength of the LTE signal is sufficiently changed to the extent that an accurate position estimation of the moving node 1 can be performed within a movement distance corresponding to a length of a change pattern of the signal strength. Accordingly, even in a case where there is almost no change in the strength of the LTE signal between the adjacent localization points on the movement route of the moving node 1, the SLAM algorithm according to the present embodiment can accurately estimate the position of the moving node 1.

In this wat, the SLAM algorithm according to the present embodiment can accurately estimate a position of the moving node 1 by using an LTE signal with almost no change in a signal strength between measurement points on a movement route, thereby, being able to create a map which can cover both an indoor space and an outdoor space. As a result, the SLAM algorithm according to the present embodiment can provide a map which can perform a highly accurate indoor localization and outdoor localization even in the center of a city without being influenced by a skyscraper by using LTE signals widely distributed in the inside of a building and the center of a city, thereby, being able to be replaced with a map based on the GPS which is widely used as a car navigation system nowadays but cannot be used for indoor localization and of which localization accuracy is significantly degraded in the center of a city, and being able to accelerate realization of fully autonomous driving including an outdoor space and an indoor space.

In the above description, in a case where a WiFi signal and an LTE signal are used, superiority of localization accuracy of the SLAM algorithm according to the present embodiment is described, but signals that can be used for the SLAM of the present embodiment are not limited to this, and the localization according to the SLAM of the present embodiment can be performed by using strength of a radio signal such as Bluetooth, Zigbee, Lora, or the like.

In step 310, the position correction unit 70 of the moving node 1 corrects the relative position of the moving node 1 estimated in step 30, based on a comparison between a change pattern of the signal strength generated in step 430 and distribution of the signal strength in a region where the moving node 1 is located. Here, the signal strength distribution in the region where the moving node 1 is located is a signal intensity distribution of the map stored in the storage 30. More specifically, in step 310, the position correction unit 70 corrects a coordinate value of the relative position of the moving node 1 estimated in step 230 by using a coordinate value of a reception position of the moving node 1 estimated in step 450, thereby, correcting the relative position estimated in step 230. In the present embodiment, correction of a position or correction of a coordinate value means that the position or the coordinate value is optimized so as to approximate an actual position or an actual coordinate value, which does not necessarily mean that the position or the coordinate value is changed.

Generally, since a position in a localization field is estimated based on a probability model, there is always an error in an estimated value of the position. For example, a point where the moving node 1 is actually located at is not known even by the relative localization and the wireless localization used for the SLAM according to the present embodiment, but the point is estimated as a position of the moving node 1 on the assumption that probability of being located at the point is high. As described above, the relative position of the moving node 1 estimated in step 230 is very low due to error accumulation and the like. The present embodiment corrects the relative position estimated in step 230, based on a comparison between the change pattern of the signal strength generated in step 430 and the distribution of the signal strength in the region at which the moving node 1 is located, thereby, reducing an error of the relative position of the moving node 1.

Figure 12:
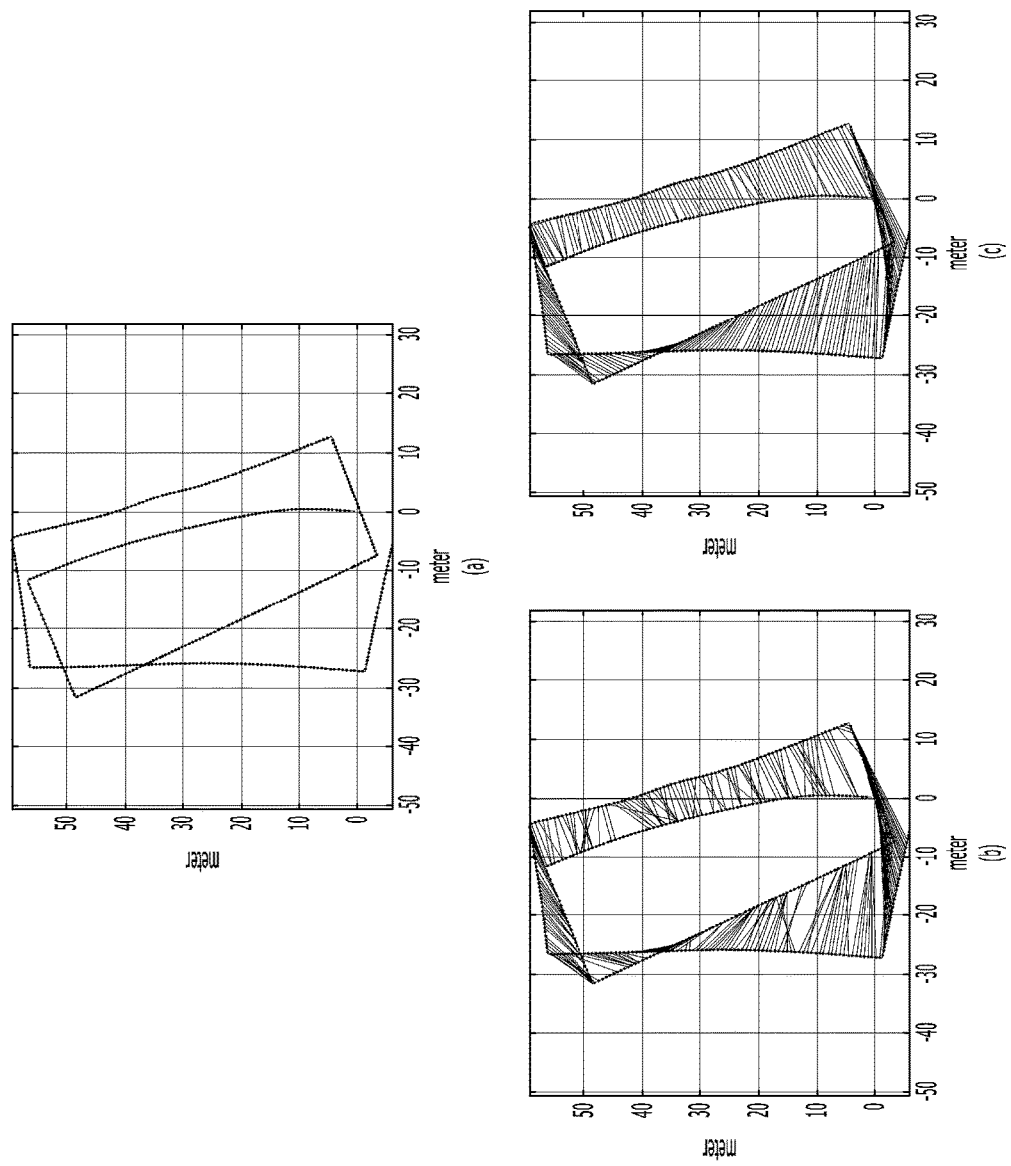
FIGS. 12A to 12C are movement trajectory diagrams of the moving node estimated by a PDR algorithm in the target region illustrated in FIG. 8.

FIGS. 12A to 12C are movement trajectory diagrams of the moving node 1 estimated by a PDR algorithm in the target region illustrated in FIG. 8. FIG. 12A illustrated a movement trajectory of the moving node 1 estimated by the PDR algorithm, while a user holds a smartphone, starts from a starting point (0,0), and turns a corridor of a building twice. From this, it can be seen that the trajectory estimated at the first turn and the trajectory estimated at the second turn are very different from each other. Particularly, it can be seen that the trajectory estimated at the second turn is far different from an actual trajectory of the moving node 1 due to accumulation of errors of the PDR. FIG. 12B illustrates a state where localization points having similar strengths of signals received at the respective localization points in the first movement trajectory and the second movement trajectory are connected to each other, and FIG. 12C illustrates a state where localization points having similar change patterns of signal strengths generated at the respective localization points in the first movement trajectory and the second movement trajectory are connected to each other.

It can be seen from FIG. 12B that, in a case where a signal received at a certain localization point is in an abnormal state such as a state where the signal is very weak or deformed, a strength error of the signal received at the localization point is very large, and thereby, the localization points corresponding to actual same positions in the first movement trajectory and the second movement trajectory are not connected to each other and wrong localization points are connected to each other. It can be seen from FIG. 12C that, even in a case where a signal received at a certain localization point is in an abnormal state such as a state where the signal is very weak or deformed, an entire shape of the change pattern of the signal strengths generated at the respective localization points is rarely influenced, and thereby, localization points corresponding to actual same points in the first movement trajectory and the second movement trajectory are relatively accurately connected to each other.

Accordingly, it can be seen that an error of a relative position of the moving node 1 is accurately corrected over the entire target region, when a coordinate value of the relative position of the moving node 1 is corrected by using a coordinate value of a reception position of the moving node 1 estimated by a wireless localization algorithm based on the surface correlation according to the present embodiment, compared with a case where the coordinate value of the relative position of the moving node 1 is corrected by using a coordinate value of a reception position of the moving node 1 estimated by the wireless localization algorithm of related art. As a result, localization accuracy of the moving node 1 is improved, and thereby, it is possible to create a map in which accurate route information is recorded.

Particularly, since the wireless localization unit 60 estimates the reception position of the moving node 1 by using the wireless localization based on the surface correlation using the change pattern of at least one signal strength received over a plurality of time points, an error in an estimated value of the reception position of the moving node 1 rarely occurs, even if there is a change in an wireless environment, such as a signal interference between communication channels, expansion of an access point, occurrence of failure or an obstacle. In the present embodiment, the coordinate value of the relative position of the moving node 1 estimated in step 230 is corrected by using the coordinate value of the reception position of the moving node 1 estimated in step 450, and thereby, a current position of the moving node 1 can be accurately estimated by correcting the relative position of the moving node 1 even in a case where a wireless environment change is made.

A reason why the accuracy of wireless localization based on the surface correlation is very high is that an error of the signal received at a current time point can be corrected by a change pattern of the signals received at various time points in the past even in a case where the signal received at the current time point is in an abnormal state such as a case where the signal is very weak or deformed because since the surface correlation uses a change pattern of at least one signal strength received over a plurality of time points. Meanwhile, when the moving node 1 is located at a branch where one path is divided into several branches or a point where the moving node enters from a narrow alley into a wide square, change patterns of the signals received over various time points in the past are all the same with respect to an arbitrary route in several paths or in the square, and thereby, It is very difficult to estimate into which path the moving node 1 enters among the several paths or in which direction the moving node 1 proceeds in the square, in a case where the signal received at the current time point is in an abnormal state such as a case where the signal is very weak or deformed.

Accordingly, in a case where a route change occurs, for example, one path is divided into several branches or the moving node enters from a narrow alley to a wide square, the accuracy of the wireless localization based on the surface correlation according to the present embodiment may be lowered. The relative localization unit 40 estimates the relative position of the moving node 1 on the basis of movement sensing of the moving node 1 made by the sensor unit 20, and thereby, a route change such as a case where one path is divided into several branches or the moving node enters from a narrow alley to a wide square does not influence the accuracy of the estimated value of the relative position of the moving node 1.

The present embodiment corrects a coordinate value of a reception position of the moving node 1 estimated by a relative localization based on movement sensing of the moving node 1 by using the coordinate value of the reception position of the moving node 1 estimated by the wireless localization based on the surface correlation, and thereby, not only an error of the relative position of the moving node 1 can be reduced through mutual correction between defects in the relative localization and defects in the wireless localization, but also accuracy of the estimated value of the reception position of the moving node 1 can be prevented a decrease due to a change in the route or the like. That is, the present embodiment can accurately estimate a current position of the moving node 1 all the time by performing mutual complementing between defects of the relative localization and defects of the relative localization even in various environmental changes such as a wireless environment change or a route change, and a map in which very accurate route information is recorded can be created by recording the current position of the moving node 1 which is accurately estimated in this way and the strength of the signal received at the current position.

In step 310, the position correction unit 70 corrects the coordinate value of the relative position of the moving node 1 estimated in step 230 by using the coordinate value of the reception position of the moving node 1 estimated in step 450 in accordance with following Equation 1, thereby, correcting the relative position estimated in step 230. Equation 1 is an equation for calculating X*, that is, new n coordinate values, which minimizes the sum of left square terms and the sum of right square terms with respect to n position coordinate values corresponding to X. Equation 1 can be obtained by using a Gauss-Newton method or the like.

$$X^* = \underset{x}{\operatorname{argmin}} \sum_{i} \|f(x_i, u_{i+1}) - x_{i+1}\|^2 + \sum_{jk} \|g(x_j, v_j) - x_k\|^2 \quad \text{Equation 1}$$

In a case where the moving node 1 is a smartphone carried by a user, $X = \{x1, x2, x3, \ldots, x_i, x_{i+1}, \ldots, x_n\}^T$ in Equation 1 on assumption that the user walked by n−1 steps from a position $x_1$ of the first step. Here, a superscript T means a column vector in which n position coordinate values are arranged in a line. Since a movement speed and a movement direction of the user are greatly changed, each step of the user is set as each localization point on a movement route of the moving node 1. The step of the user can be searched by a sensor embedded in the smartphone. That is, the moving node 1 estimates a relative position and simultaneously estimates a reception position at each step of the user. If the moving node 1 is a navigation system mounted on a vehicle, a localization point may be set for each distance on the movement route of the moving node 1 instead of steps of the user.

"$x_i$" of the left square term means a coordinate value of a relative position of an i-th step with respect to an (i−1)th step of a user, "$x_{i+1}$" means a coordinate value of a relative position of (i+1)th step with respect to the ith step of the user, and "$u_{i+1}$" means a movement distance and a movement direction to the relative position of (i+1)th step from the relative position of the ith step. "$f(x_i, u_{i+1})$" means a function for calculating a coordinate value of the relative position of the (i+1)th step of the user by applying $u_{i+1}$ to the coordinate value of relative position of the ith step of the user. If a coordinate system of a map created according to the present embodiment is a two-dimensional coordinate system, "$f(x_i, u_{i+1})$" may be represented by following Equation 2

$$x_{i+1,1} = x_{i,1} + \cos(h_{i+1}) \cdot l_{i+1}$$

$$x_{i+1,2} = x_{i,2} + \sin(h_{i+1}) \cdot l_{i+1} \quad \text{Equation 2}$$

In Equation 2, a coordinate value of "$x_i$" is $(x_{i,1}, x_{i,2})$ and a coordinate value of "$x_{i+1}$" is $(x_{i+1,1}, x_{i+1,2})$. "$h_{i+1}$" indicates a movement direction from the relative position of the ith step to the relative position of the (i+1)th step, and "$l_{i+1}$" indicates a movement distance. "$u_{i+1}$" is a movement distance and a movement direction calculated from a value of the output signal of the sensor unit 20. There is always an error in the movement distance and the movement direction calculated from the value of the output signal of the sensor unit 20, that is, that is, $u_{i+1}$ due to a hardware error of the sensor itself, noise introduced into the sensor, and the like. Accordingly, there is always an error in the calculated value of $f(x_i, u_{i+1})$, that is, the estimated value of the relative position of the moving node 1, and in order to increase accuracy of relative localization, a constraint that the error has to be minimized occurs. The error constraint of this relative localization is represented by a left square term of Equation 1.

For example, in order to reduce an error of the relative localization, "$x_{i+1}$" can be calculated by applying a current progress direction of a user and an average step width of the user to the coordinate value of the relative position of the ith step of the user. If a left square term is calculated for $X = \{x1, x2, x3, \ldots, x_i, x_{i+1}, \ldots, x_n\}^T$ and $X = \{x1, x2, x3, \ldots, x_i, x_{i+1}, \ldots, x_n\}^T$ is updated by using a new value that minimizes the calculated value, it is possible to prevent a phenomenon in which the estimated value of the relative position of the moving node 1 excessively deviates from an actual position of the moving node 1 due to an error of a sensor, from occurring. As described above, an error of a relative localization algorithm such as PDR or DR has characteristics in which errors of the relative position of the moving node 1 are accumulated as estimation of the relative position of the moving node 1 is repeated. Due to the characteristics and other causes, there is a limit to increase accuracy of the relative localization only by using a constraint of minimizing the error of $f(x_i, u_{i+1})$. The present embodiment improves accuracy of the estimated value of the relative position of the moving node 1 by adding a constraint that minimizes the right square term to the constraint that minimizes the left square term.

"$X_j$" of a right square term means a current position of the moving node 1 that receives a signal sent from the fixed node 2, "$V_j$" means a change pattern of the signal strength generated at a current position $x_j$ of the moving node 1, and "$X_k$" means an absolute position of a localization point having a pattern most similar to the change pattern of the signal strength generated at a current position $x_j$ of the moving node 1 within a signal strength distribution in a target region among the localization points of the map stored in the storage 30. "$g(x_j, v_j)$" means a function for calculating an absolute position of the part having a pattern most similar to the change pattern $v_j$ of the signal strength generated at the current position $x_j$ of the moving node 1 within the signal strength distribution in the target region.

As described above, the comparison unit 65 searches for a pattern most similar to the change pattern $v_j$ of the signal strength generated at the position $x_j$ of the moving node 1, based on the surface correlation between the change pattern $v_j$ of the signal strength generated at the current position $x_j$ of the moving node 1 and the signal strength distribution in the target region, and thus, it can be said that "$g(x_j, v_j)$" is a function of the wireless localization algorithm based on the surface correlation described above. That is, the reception position estimation unit 66 estimates a reception position of the moving node 1 with respect to a signal received at the current position $x_j$ of the moving node 1 in accordance with $g(x_j, v_j)$. In this way, the calculated value of "$g(x_j, v_j)$" is the estimated coordinate value of the reception position of the moving node 1. It may be said that "$x_k$" is a localization point corresponding to the previous reception position having a coordinate value closest to the coordinate value of the currently estimated reception position of the moving node 1, that is, the localization point of the map stored in the storage 30.

In order to satisfy a constraint that a right square term of Equation 1 has to be minimized, the coordinate value of "$g(x_j, v_j)$" and the coordinate value of "$x_k$" have to be the same. The coordinate value of "$x_k$" is any one of the coordinate values of the localization points stored in the storage 30, that is, the coordinate values closest to the calculated value of "$g(x_j, v_j)$" among $X=\{x1, x2, x3, \ldots, x_i, x_{i+1}, \ldots, x_n\}^T$, and is an estimated value of the relative position of the moving node 1 obtained by the relative localization or a corrected value for the estimated value. Since the signal strength distribution cannot be known when the moving node 1 first turns a certain route in a target region, the relative position of the moving node 1 cannot be corrected, and thereby, a coordinate value of "$x_k$" becomes the estimated value of a relative position of the moving node 1 obtained by only the relative localization.

Since accuracy of the estimated value of a position of the moving node 1 due to the wireless localization based on the surface correlation according to the present embodiment is very high, the estimated value of the position of the moving node 1 obtained by the relative localization is the same as the estimated value of the position of the moving node 1 obtained by the wireless localization based on the surface correlation, if there is no error of the relative localization. However, the coordinate value of "$g(x_j, v_j)$" and the coordinate value of "$x_k$" cannot be the same as each other due to an error of the relative localization, typically an error of the PDR. Accordingly, in the present embodiment, the coordinate value of the localization point of the map stored in the storage 30 is updated so as to make the coordinate value of the localization point of the map stored in the storage 30 approach the coordinate value of "$g(x_j, v_j)$", and thereby, accuracy of the coordinate value of the localization point of the map stored in the storage 30 is improved.

In this way, in step 310, the position correction unit 70 corrects the coordinate value of the relative position of the moving node 1 estimated in step 230 and the coordinate values of the respective localization points in the signal strength distribution of the map stored in the storage 30 in such a manner that a difference between the coordinate value of the reception position of the moving node 1 estimated in step 450 in accordance with Equation 1 and the coordinate value of the localization point closest to the coordinate value of the reception position among the localization points within the signal strength distribution of the map stored in the storage 30 is minimized. The localization points within the signal strength distribution of the map stored in the storage 30 are points at which the relative position of the moving node 1 is previously measured on the movement route of the moving node 1. The moving node 1 repeatedly updates the coordinate values of the respective localization points through Equation 1 while turning a certain route in the target region, thereby, optimizing a graph of the route represented by a plurality of localization points so as to approach an actual route.

As described above, the present embodiment improves the accuracy of the estimated value of the relative position of the moving node 1 by adding a constraint that minimizes the right square term to a constraint which minimizes the left square term. That is, in step 310, the position correction unit 70 corrects the coordinate value of the relative position of the moving node 1 estimated in step 230 and the coordinate values of the respective localization points in the signal strength distribution of the map stored in the storage 30, in such a manner that an error between the coordinate value of the relative position estimated in step 450 in accordance with Equation 1 and a coordinate value of another relative position of the moving node 1 based on the relative position is minimized, and at the same time, a difference between the coordinate value of the reception position of the moving node 1 estimated in step 450 and the coordinate value of the localization point closest to the coordinate value of the reception position among the localization points within the signal strength distribution of the map stored in the storage 30 is minimized.

In this way, in the present embodiment, the estimated value of the relative position of the moving node 1 is not corrected by using the estimated value of the position of the moving node 1 obtained by the wireless localization based on the surface correlation as it is, and a constraint is added in which the error between the coordinate value of the relative position estimated in step 450 and the coordinate value of another relative position of the moving node 1 based on the relative position has to be minimized, and thereby, it is possible to accurately estimate a current position of the moving node 1 by performing mutual complementing between defects in the relative localization and defects in the wireless localization even in various environment changes such as a wireless environment change and a route change, and it is possible to create a map in which very accurate route information is recorded by recording the coordinate value of the position of the moving node 1 accurately estimated in this way and the strength of the signal received at the position.

Figure 13:
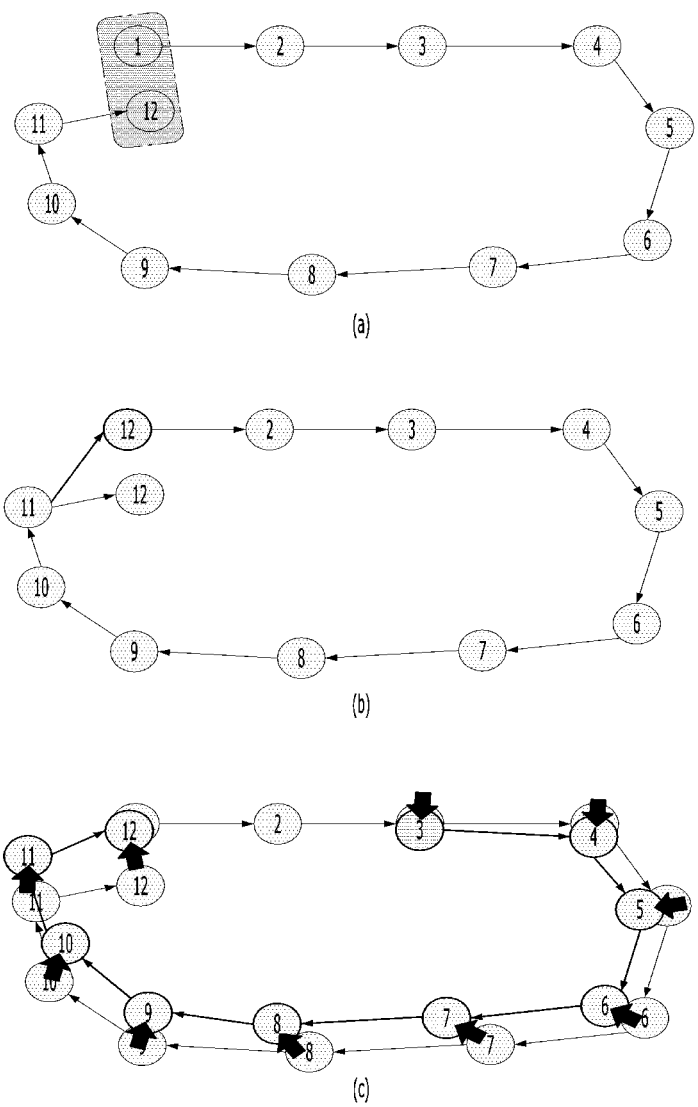
FIGS. 13A to 13C are diagrams illustrating an example of correction of a relative position made by the SLAM according to the present embodiment.

FIGS. 13A to 13C are diagrams illustrating an example of correction of a relative position made by the SLAM according to the present embodiment. In each of FIGS. 13A to 13C, step numbers of the moving node 1 are marked at the relative positions of the moving node 1 estimated by the relative localization unit 50 for each step using the PDR algorithm, when a user holds a smartphone in his hand, starts from a first localization point, walks 11 steps, and returns to the first localization point. The moving node 1 estimates a relative position indicating a second localization point with respect to the first localization point from a movement distance calculated from a value of an output signal of the sensor unit 20 and a moving direction while moving by one step after starting from the first localization point. In the same manner, the moving node 1 estimates the relative positions of the moving node 1 at third to twelfth localization points while moving by one step from the second localization point.

Since the user started from the first localization point and returned to the first localization point, the first localization point and the 12th localization point are the same position in an actual physical terrain. As illustrated in FIG. 13A, although the 12th localization point has to be marked on the 1st localization point so as to be overlapped, the 12th localization point is marked at another position around the first localization point due to accumulation of PDR errors. In the SLAM algorithm of related art, a loop closure indicates a process of improving accuracy of a map by adjusting a coordinate value of a landmark estimated at the time of arrival to a coordinate value of a landmark at the time of start, in a case where the coordinate value of the landmark estimated at the time of arrival differs from the coordinate value of the landmark at the time of start, when a user starts from a certain landmark, moves along a loop-shaped route, and returns to the same landmark.

As illustrated in FIG. 13B, if only the 12th localization point is moved to the 1st localization point, an error of the relative localization at the other localization points is neglected. Although the moving node 1 turned in a root form, a starting point and an ending point are a main cause of accumulation of the PDR errors, that is, accumulation of relative localization errors at all the localization points, and thus, the relative localization errors at each localization point has to be corrected as illustrated in FIG. 13C. As described above, the SLAM algorithm of related art has a problem of the loop closure through identification of the landmark, and in order to identify the landmark, a sensor such as a LiDAR, a camera, or an ultrasonic sensor is required.

In a case where the moving node 1 starts from the starting point corresponding to the first localization point, turns a route of a route form, and arrives at a destination corresponding to a geographically identical position to the starting point, in step 310, the position correction unit 70 corrects the coordinate value of the relative position of the moving node 1 estimated in step 230 and the coordinate values of each localization point in the signal strength distribution of the map stored in the storage 30, such that a difference between a coordinate value of an arrival point which is the reception position of the moving node 1 estimated in step 450 according to Equation 1 and a coordinate value of the starting point which is a localization point closest to the coordinate value of the arrival point among the localization points in the signal strength distribution of the map stored in the storage 30. Here, the coordinate value of the arrival point which is the reception position of the moving node 1 estimated in step 450 is the coordinate value of the position of the moving node 1 estimated by the wireless localization based on the surface correction, and thus, accuracy of the position is very high.

Accordingly, an error of the estimated value of the relative position of the arrival point can be greatly reduced through the process of adjusting the coordinate value of the arrival point so as to match or approximate the coordinate value of the starting point which is the reception position of the moving node 1 estimated in step 450, without identifying the landmark using a sensor such as a LiDAR, a camera, or an ultrasonic sensor. In the present embodiment, similarity between the change pattern of the signal strength generated by the pattern generation unit 64 and a corresponding pattern in the signal strength distribution of the map stored in the storage 30 plays a role of a kind of landmark instead of a physical landmark. According to the present embodiment, a problem of the loop closure is solved even without a separate sensor for a physical identification of the landmark, and thereby, accuracy of a map can be improved.

Figure 14:
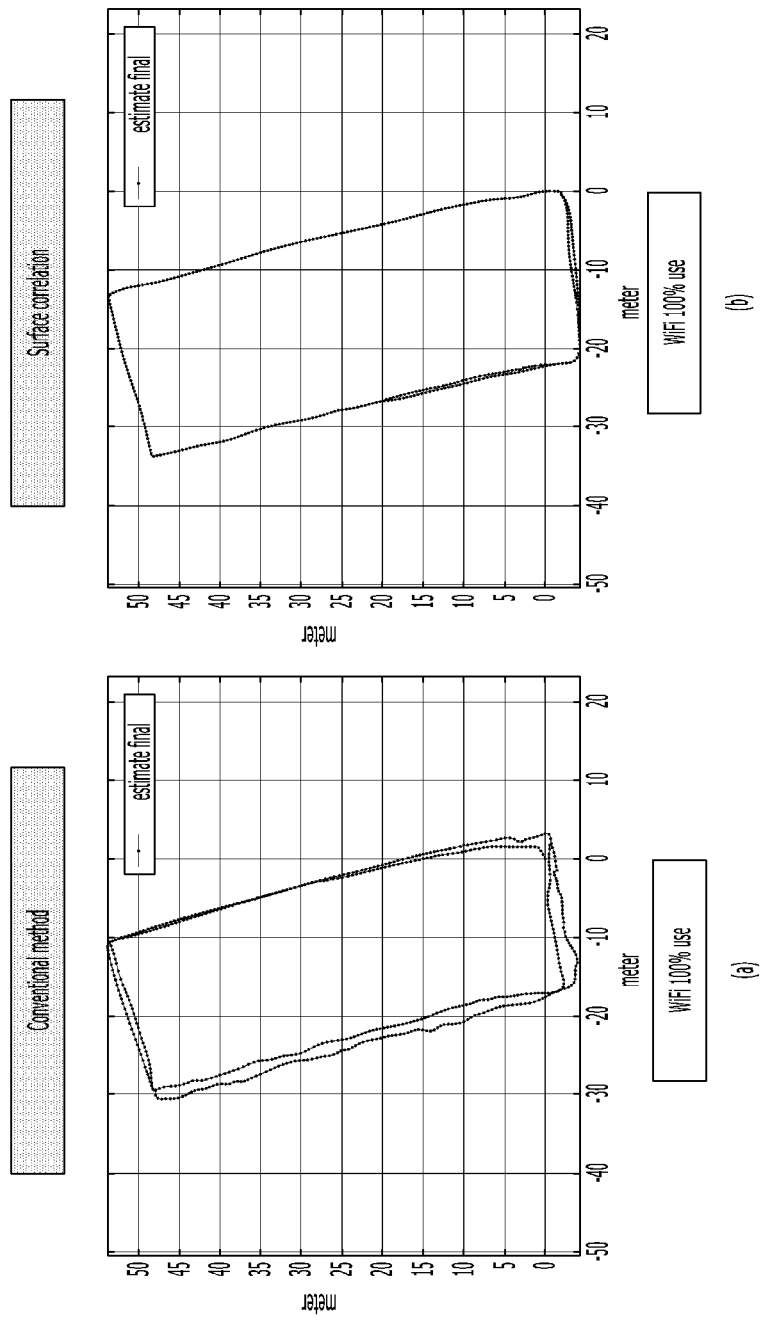
Figure 15:
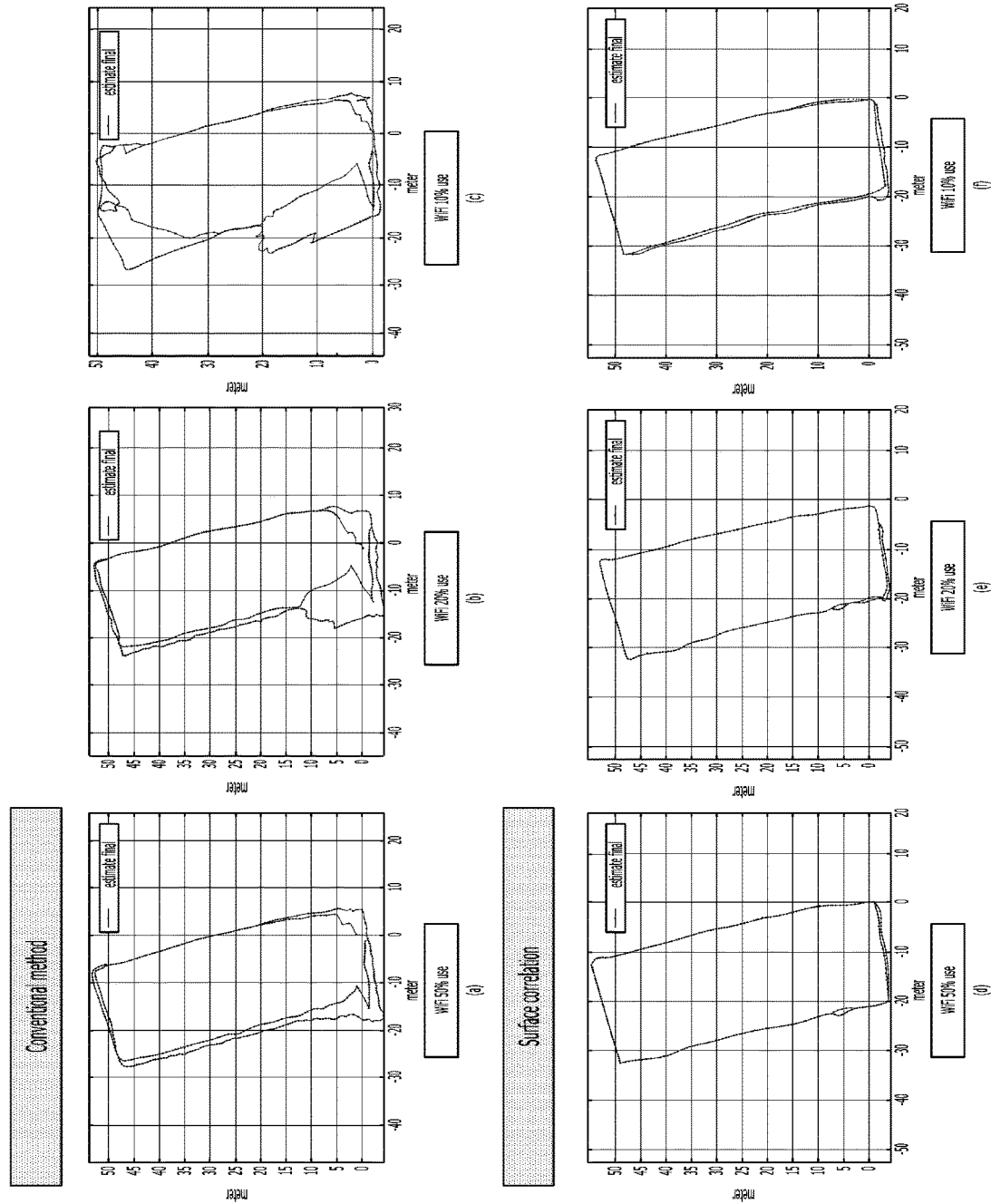

FIGS. 14A to 15F are diagrams obtained by comparing SLAM performance tests for the wireless localization algorithm or related art and the wireless localization algorithm according to the present embodiment with each other. While a user starts from a starting point (0, 0) and turns around a corridor of a building with a smartphone in his hand in the target region illustrated in FIG. 8, the user estimates the reception position of the moving node 1 for each localization point on the movement route of the moving node 1 using the wireless localization algorithm, and while the coordinate value of the relative position of the moving node 1 is corrected by using the estimated value of the reception position of the moving node 1, a dot is marked in each position corresponding to the corrected coordinate value in a coordinate system of the map stored in the storage 30, and dots are connected to each other. FIG. 14A illustrates a movement trajectory of the moving node 1 corresponding to arrangement of a plurality of localization point dots marked through this process.

FIG. 14B illustrates the movement trajectory of the moving node 1 in the same manner as in the SLAM performance test of FIG. 14A, except that the reception position of the moving node 1 is estimated for each localization point using the wireless localization algorithm based on the surface correlation of the present embodiment instead of the wireless localization algorithm of related art. Particularly, the tests of FIGS. 14A and 14B were performed in a state where all the dozens of access points installed in the target region illustrated in FIG. 8 operated. It can be seen that the movement trajectory of the moving node 1 estimated by the SLAM algorithm employing the wireless localization algorithm based on the surface correlation of the present embodiment is much closer to an actual shape of a corridor of a building than the movement trajectory of the moving node 1 estimated by the SLAM algorithm employing the wireless localization algorithm of related art.

FIGS. 15A to 15C illustrate the movement trajectories of the moving node 1 in a case where a test is performed in the same manner as the test of FIG. 14A in a state where the access points installed in the target region illustrated in FIG. 8 operated at 50%, 20%, and 10%, respectively. FIGS. 15D to 15F illustrate the movement trajectories of the moving node 1 in a case where a test is performed in the same manner as the test of FIG. 14B in a state where the access points installed in the target region illustrated in FIG. 8 operated at 50%, 20%, and 10%, respectively. It can be seen from FIGS. 15A to 15C that the movement trajectory of the moving node 1 estimated by the SLAM algorithm employing the wireless localization algorithm of related art is very sensitive to the number of access points thereby being greatly distorted.

It can be seen from FIGS. 15D to 15F that the movement trajectory of the moving node 1 estimated by the SLAM algorithm employing the wireless localization algorithm based on the surface correlation of the present embodiment maintains a shape similar to an actual shape of a corridor of a building without being greatly influenced by the number of access points installed in the target region illustrated in FIG. 8. In this way, in the present embodiment, the smaller number of access points than the number of access points required for establishing a good wireless environment are installed in a certain region, and thereby, a map in which very accurate route information is recorded can be created even in a case where a wireless environment poor.

As described above, in the wireless localization algorithm of related art, an error of the estimated value of the reception position of the moving node 1 is very large, in a case where there is a wireless environment change such as signal interference between communication channels, extension of an access point, and occurrence of a failure or an obstacle, or wireless environment is poor due to lack of the number of access points. On the other hand, the SLAM algorithm according to the present embodiment estimates the reception position of the moving node 1 using a change pattern of at least one signal strength according to a relative change of a position of the moving node over a plurality of time points, and thus an error of the estimated value rarely occurs even if there is a wireless environment change such as signal interference between communication channels, extension of an access point, and occurrence of a failure or an obstacle, or wireless environment is poor due to lack of the number of access points. As a result, the SLAM algorithm employing the wireless localization algorithm based on the surface correlation of the present embodiment can create a map in which very accurate route information is recorded, even in a case where there is a wireless environment change such as a change in the number of access points, or wireless environment is poor due to lack of the number of access points.

In step 320, the mapping unit 80 of the wireless localization unit 60 of the moving node 1 represents the route of the region using the relative position of the moving node 1 corrected in step 310, thereby, creating a map for the target region. Whenever the steps 110, 120, 130, and 310 are repeatedly performed for each of the plurality of time points, the map creation unit 80 arranges and records a plurality of coordinate values of the relative positions corrected at a plurality of time points in storage 30 in step 320, thereby, representing the route of the target region, and maps the coordinate values of the relative positions of the moving node 1 corrected at each time point in the storage 30 and records an ID of at least one fixed node transmitting at least one signal received at the same time point as each time point and strength of the at least one signal, thereby, creating a map of the signal strength distribution of the target region. In this way, since the position estimation of the moving node 1 and the map creation can be performed at the same time, time and cost consumed in the map creation can be greatly reduced compared with a method in which a person directly collects terrain information or signal information.

If the moving node 1 repeatedly travels all the routes in the target region by the number of times corresponding to a target map accuracy of the present embodiment, a map in which round information, signal strength information, and fixed node information with very high accuracy are recorded is completed and stored in the storage 30. In a case where a map created by the SLAM algorithm according to the present embodiment includes a radio map based on a Wi-Fi signal, as illustrated in FIG. 7, route information, Wi-Fi signal strength information, and access point information are recorded in the map, and In a case where a map created by the SLAM algorithm according to the present embodiment includes a radio map based on an LTE signal, route information, LTE signal strength information, and base station information are recorded in the map. If a map with a target accuracy is stored in the storage 30, the map creation unit 80 transmits the map created in this way to the localization server 3 through the wireless communication unit 10.

Figure 16:
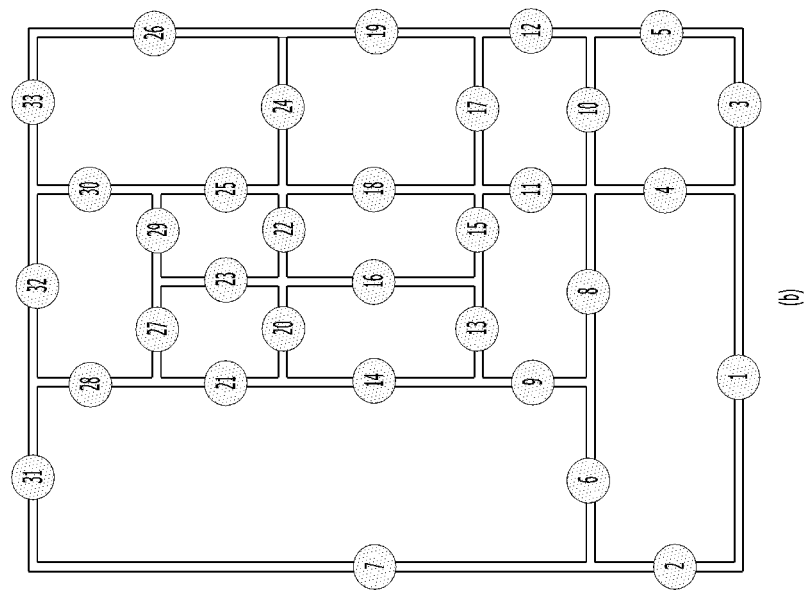
FIGS. 16A and 16B are diagrams illustrating examples of maps created by the SLAM algorithm according to the present embodiment.
Figure 16:
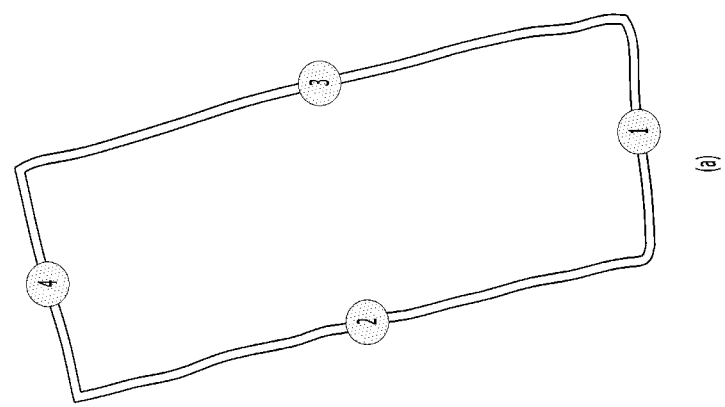

FIGS. 16A and 16B are diagrams illustrating examples of maps generated by the SLAM algorithm according to the present embodiment. FIG. 16A illustrates a map created by the SLAM algorithm according to the present embodiment with respect to the target region illustrated in FIG. 8. It can be seen from FIG. 16A that a corridor shape in the map created by the SLAM algorithm according to the present embodiment is represented to be approximate an actual corridor shape illustrated in FIG. 8 by arrangement of the localization points having the coordinate values of the relative positions of the moving node 1 corrected by the SLAM algorithm according to the present embodiment. A route graph in the map can be generated from the numerical values in the table illustrated in FIG. 7. FIG. 16B illustrates an example of the map created by the SLAM algorithm according to the present embodiment with respect to a target region having various routes. The map illustrated in FIG. 16B can be created in the same manner as in the example of FIG. 16A by the SLAM algorithm described above.

As illustrated in FIGS. 16A and 16B, a physical terrain of the real world is simplified into a plurality of map links and a plurality of map nodes to be represented in the map created by the SLAM algorithm according to the present embodiment. Each map link represents a linear path through which a person or a vehicle can pass, and each map node is represented in the form of a map node indicating a point where a plurality of map links joins or a point where one map link curves. That is, each map node indicates a point where a path crosses a path, a point where one path starts to divide into several branches, or a point where a road curves. In the present embodiment, each map link becomes one cluster. A sequence number of each cluster is represented in each map link. Any moving node can perform the wireless localization based on the surface correlation described above or perform the wireless localization of related art by receiving data of at least one cluster around clusters of the map stored in the localization server 3. Particularly, in a case where the wireless localization based on the surface correlation is performed on the map created by the SLAM algorithm according to the present embodiment, it is possible to obtain results of localization with very high accuracy.

Meanwhile, the integrated localization method according to the embodiment of the present invention described above can be implemented by a program executable in a processor of a computer and can be implemented by a computer that records the program in a computer-readable recording medium and execute the program. The computer includes any type of computer capable of executing a program, such as a desktop computer, a notebook computer, a smartphone, an embedded type computer, and the like. In addition, a structure of data used for the above-described embodiment according to the present invention can be recorded in a computer-readable recording medium through various means. The computer readable recording medium includes a storage medium such as a RAM, a ROM, a magnetic storage medium (for example, a floppy disk, a hard disk, and the like), and an optically readable medium (for example, a CD ROM, a DVD, and the like).

The present invention is described above with reference to preferred embodiments thereof. It will be understood by those skilled in the art that the present invention may be embodied in various forms without departing from the spirit or essential characteristics thereof. Therefore, the disclosed embodiments should be considered in an illustrative viewpoint rather than a restrictive viewpoint. The scope of the present invention is defined by the appended claims rather than by the above description, and all differences within the scope of equivalents thereof should be construed as being included in the present invention.

The invention claimed is:

1. A simultaneous localization and mapping (SLAM) method of a moving node, the method comprising:
   estimating a relative position of the moving node, based on motion sensing of the moving node;
   generating a change pattern of at least one signal strength that is received over a plurality of time points;
   correcting the estimated relative position, based on a comparison between the generated change pattern of the at least one signal strength and a signal strength distribution in a region in which the moving node is located;
   creating a map for the region by representing a route of the region using the corrected estimated relative position; and
   estimating a reception position of the moving node for at least one signal that is received at a current time point among the plurality of time points based on a comparison between the generated change pattern of the at least one signal strength and the signal strength distribution.

2. The SLAM method of claim 1, wherein the change pattern of the at least one signal strength is a change pattern of at least one signal strength that is represented as continuous arrangement of at least one signal strength which is received a plurality of times at a plurality of relative positions of the moving node that are estimated at the plurality of time points.

3. The SLAM method of claim 1,
   wherein the correcting of the relative position corrects the estimated relative position by correcting a coordinate value of the estimated relative position using a coordinate value of the estimated reception position.

4. The SLAM method of claim 3, further comprising:
   searching a part having a pattern most similar to the change pattern of the generated signal strength within the signal strength distribution by comparing the generated change pattern of the signal strength with the signal strength distribution,
   wherein the estimating of the reception position estimates an absolute position in the region that is indicated by the searched part as a reception position of the moving node.

5. The SLAM method of claim 3, further comprising:
   searching, within the signal strength distribution, a surface part having a shape most similar to a pattern of a geometric surface shape that graphically representing a change of at least one signal strength according to a relative change of a position of the moving node,
   wherein the estimating of the reception position estimates an absolute position in the region that is indicated by the searched surface part as a reception position of the moving node.

6. The SLAM method of claim 5, wherein the generating of the change pattern of the at least one signal strength generates the pattern of the geometric surface shape in such a manner that a dot is marked on a point of multidimensional space that is determined by mapping an ID of a certain fixed node on a first coordinate axis of the multidimensional space, mapping the relative position of the moving node on a second coordinate axis, and mapping strength of a signal that is transmitted from the certain fixed node on a third coordinate axis.

7. The SLAM method of claim 3, wherein the correcting of the relative position corrects the coordinate value of the estimated relative position in such a manner that a difference between the coordinate value of the estimated reception position and a coordinate value of a localization point closest to the coordinate value of the reception position among localization points within the signal strength distribution is minimized, and
   wherein the localization points are points where the relative position of the moving node is measured on a movement route of the moving node.

8. The SLAM method of claim 7, wherein the correcting of the relative position minimizes an error between the coordinate value of the estimated relative position and a coordinate value of another relative position of the moving node based on the estimated relative position, and simultaneously corrects the coordinate value of the estimated relative position in such a manner that the difference between the coordinate value of the estimated reception position and the coordinate value of the localization point closest to the coordinate value of the reception position among the localization points within the signal strength distribution is minimized.

9. The SLAM method of claim 7, wherein the correcting of the relative position corrects the coordinate value of the estimated relative position in such a manner that a difference between a coordinate value of an arrival point which is the estimated reception position and a coordinate value of a starting point which is a localization point closest to the coordinate value of the arrival point among the localization points within the signal strength distribution is minimized, and
   wherein the moving node starts from the starting point, turns a route of a route form, and arrives at the arrival point corresponding to a geographically identical position to the starting point.

10. The SLAM method of claim 3, wherein the estimating of the reception position includes,
    measuring strength of at least one signal that is transmitted from the at least one fixed node;
    generating a change pattern of at least one signal strength according to a relative change of a position of a moving node over a plurality of time points from the measured at least one signal strength and the relative position of the estimated moving node; and
    estimating the reception position, based on a comparison between the change pattern of the generated at least one signal strength and distribution of signal strength in the region.

11. The SLAM method of claim 10, wherein the generating of the change pattern of the at least one signal strength generates the change pattern of the at least one signal strength by accumulating pattern data representing a pattern of at least one signal strength that is received from the at least one fixed node at the estimated relative position, on pattern data with respect to a relative position which is estimated before the relative position is estimated.

12. The SLAM method of claim 11, wherein the generating of the change pattern of the at least one signal strength generates the pattern data from spatial domain data representing the measured each signal strength in association with the estimated relative position.

13. The SLAM method of claim 10, wherein the measuring of the signal strength, the estimating of the relative position, the generating of the pattern, and the correcting of the relative position are repeatedly performed for each of the plurality of time points, and
    wherein the creating of the map represents the route of the region by arranging and recording coordinate values of a plurality of relative positions that are corrected at the plurality of time points, and generates the map by mapping to the coordinate value of the relative position that are corrected at the each time point and recording strength of at least one signal that are received at the same point of the each time point.

14. A non-transitory computer-readable recording medium comprising:
a program for causing a computer to perform any one of the methods of claims 1 to 13.

15. A simultaneous localization and mapping (SLAM) apparatus of a moving node, comprising:
a relative localization unit that estimates a relative position of the moving node, based on motion sensing of the moving node;
a wireless localization unit that estimates a reception position of the moving node for a signal that is received at a current time point among a plurality of time points, based on a change pattern of at least one signal strength which is received over the plurality of time points;
a position correction unit that corrects the estimated relative position by correcting a coordinate value of the estimated relative position using a coordinate value of the estimated reception position; and
a map creation unit that creates a map for a region by representing a route of the region in which the moving node is located by using the corrected relative position,
wherein the wireless localization unit includes:
a signal processing unit that measures strength of at least one signal which is transmitted from the at least one fixed node;
a pattern generation unit that generates a change pattern of at least one signal strength according to a relative change of a position of a moving node over the plurality of time points from the measured at least one signal strength and the relative position of the estimated moving node; and
a reception position estimation unit that estimates the reception position of the moving node based on a comparison between the change pattern of the generated at least one signal strength and a signal strength distribution in the region.

16. The SLAM apparatus of claim 15, further comprising:
a buffer that accumulates pattern data which is generated by the pattern generation unit,
wherein the pattern generation unit generates the change pattern of the at least one signal strength by accumulating pattern data representing a pattern of at least one signal strength that is received from the at least one fixed node at the estimated relative position on pattern data which is stored in the buffer and storing the accumulated data.

17. The SLAM apparatus of claim 15, further comprising:
a storage that stores a map representing distribution of signal strength in the region,
wherein the wireless localization unit estimates the reception position, based on a comparison between the change pattern of the signal strength and the signal strength distribution of the map stored in the storage.

* * * * *